United States Patent
Khoche

(10) Patent No.: US 11,934,903 B2
(45) Date of Patent: *Mar. 19, 2024

(54) WIRELESS COMMUNICATIONS AND TRANSDUCER BASED EVENT DETECTION PLATFORM

(71) Applicant: Trackonomy Systems, Inc., San Jose, CA (US)

(72) Inventor: Ajay Khoche, West San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,473

(22) Filed: Oct. 24, 2022

(65) Prior Publication Data

US 2023/0229884 A1 Jul. 20, 2023

Related U.S. Application Data

(63) Continuation of application No. 17/126,796, filed on Dec. 18, 2020, now Pat. No. 11,531,857, which is a
(Continued)

(51) Int. Cl.
*G06K 19/077* (2006.01)
*B32B 37/06* (2006.01)
(Continued)

(52) U.S. Cl.
CPC ........ *G06K 19/07773* (2013.01); *B32B 37/06* (2013.01); *B32B 37/12* (2013.01);
(Continued)

(58) Field of Classification Search
CPC ....... G06K 19/07773; G06K 19/06037; G06K 19/0702; B32B 37/06; B32B 37/12;
(Continued)

(56) References Cited

U.S. PATENT DOCUMENTS 5,478,991 A 12/1995 Watanabe
5,495,250 A 2/1996 Ghaem
(Continued)

FOREIGN PATENT DOCUMENTS

AU 2018204317 A1 1/2019
AU 2018250358 A1 5/2019
(Continued)

OTHER PUBLICATIONS

PCT Application No. PCT/US2018/064919, Written Opinion, dated Apr. 5, 2019, 7 pages.
(Continued)

*Primary Examiner* — Seung H Lee

(57) ABSTRACT

A low-cost, multi-function adhesive wireless communications and transducer platform with a form factor that unobtrusively integrates one or more transducers and one or more wireless communication devices in an adhesive product system. In an aspect, the adhesive product system integrates transducer and wireless communication components within a flexible adhesive structure in a way that not only provides a cost-effective platform for interconnecting, optimizing, and protecting the constituent components but also maintains the flexibility needed to function as an adhesive product that can be deployed seamlessly and unobtrusively into various applications and workflows, including sensing, notification, security, and object tracking applications, and asset management workflows such as manufacturing, storage, shipping, delivery, and other logistics associated with moving products and other physical objects.

19 Claims, 9 Drawing Sheets

Related U.S. Application Data continuation of application No. 16/409,589, filed on May 10, 2019, now Pat. No. 10,902,310, which is a continuation-in-part of application No. 16/383,353, filed on Apr. 12, 2019, now Pat. No. 10,872,286, which is a continuation of application No. 15/842,861, filed on Dec. 14, 2017, now Pat. No. 10,262,255.

(60) Provisional application No. 62/670,712, filed on May 11, 2018, provisional application No. 62/435,207, filed on Dec. 16, 2016, provisional application No. 62/434,218, filed on Dec. 14, 2016.

(51) Int. Cl.
| | |
|---|---|
| B32B 37/12 | (2006.01) |
| C09J 7/38 | (2018.01) |
| G06K 19/06 | (2006.01) |
| G06K 19/07 | (2006.01) |
| H04W 4/029 | (2018.01) |
| H04W 4/02 | (2018.01) |

(52) U.S. Cl.
CPC .......... *C09J 7/38* (2018.01); *G06K 19/06037* (2013.01); *G06K 19/0702* (2013.01); *H04W 4/029* (2018.02); *B32B 2457/00* (2013.01); *C09J 2203/326* (2013.01); *C09J 2301/124* (2020.08); *C09J 2301/302* (2020.08); *C09J 2301/40* (2020.08); *C09J 2463/00* (2013.01); *H04W 4/027* (2013.01)

(58) Field of Classification Search
CPC ... B32B 2457/00; C09J 7/38; C09J 2203/326; C09J 2301/124; C09J 2301/302; C09J 2301/40; C09J 2463/00; H04W 4/029; H04W 4/027

See application file for complete search history.

(56) References Cited

U.S. PATENT DOCUMENTS

| | | | |
|---|---|---|---|
| 5,499,717 A | 3/1996 | Hayashi | |
| 5,838,253 A | 11/1998 | Wurz | |
| 5,917,433 A | 6/1999 | Keillor | |
| 6,372,342 B1 | 4/2002 | Karaoglu | |
| 6,375,780 B1 | 4/2002 | Tuttle et al. | |
| 6,404,341 B1 | 6/2002 | Reid | |
| 6,614,392 B2 | 9/2003 | Howard | |
| 6,919,803 B2 | 7/2005 | Breed | |
| 7,009,517 B2 | 3/2006 | Wood | |
| 7,020,701 B1 | 3/2006 | Gelvin et al. | |
| 7,048,194 B2 | 5/2006 | Minami et al. | |
| 7,177,054 B2 | 2/2007 | Silverbrook et al. | |
| 7,259,030 B2 | 8/2007 | Daniels et al. | |
| 7,299,990 B2 | 11/2007 | Hoshina | |
| 7,321,167 B2 | 1/2008 | Zhong et al. | |
| 7,405,656 B2 | 7/2008 | Olsen | |
| 7,511,616 B2 | 3/2009 | Lake | |
| 7,540,603 B2 | 6/2009 | Otsuki | |
| 7,722,249 B2 | 5/2010 | Kim et al. | |
| 7,838,844 B2 | 11/2010 | Wagner | |
| 7,884,727 B2 | 2/2011 | Tran | |
| 8,062,735 B2 | 11/2011 | Bi | |
| 8,072,620 B2 | 12/2011 | Yamamoto et al. | |
| 8,110,254 B1 | 2/2012 | Sharma | |
| 8,171,791 B2 | 5/2012 | Sy et al. | |
| 8,269,633 B2 | 9/2012 | Hollander et al. | |
| 8,292,173 B2 | 10/2012 | Yturralde et al. | |
| 8,401,238 B2 | 3/2013 | Stahlin et al. | |
| 8,448,530 B2 | 5/2013 | Leuenberger et al. | |
| 8,658,455 B2 | 2/2014 | Shin et al. | |
| 8,716,629 B2 | 5/2014 | Klewer et al. | |
| 8,786,510 B2 | 7/2014 | Coleman | |
| 8,833,664 B2 | 9/2014 | Choi | |
| 8,879,276 B2 | 11/2014 | Wang | |
| 8,971,673 B2 | 3/2015 | Beinhocker | |
| 9,015,071 B2 | 4/2015 | Breed | |
| 9,070,286 B2 | 6/2015 | Moore | |
| 9,137,637 B2 | 9/2015 | Bilal et al. | |
| 9,159,635 B2 | 10/2015 | Elolampi et al. | |
| 9,182,231 B2 | 11/2015 | Skaaksrud | |
| 9,183,738 B1 | 11/2015 | Allen et al. | |
| 9,189,226 B2 | 11/2015 | Driesen et al. | |
| 9,372,123 B2 | 6/2016 | Li et al. | |
| 9,473,902 B2 | 10/2016 | Bilal et al. | |
| 9,496,582 B1 | 11/2016 | Lim et al. | |
| 9,543,495 B2 | 1/2017 | Paschkewitz et al. | |
| 9,543,549 B2 | 1/2017 | Bai et al. | |
| 9,583,428 B2 | 2/2017 | Rafferty et al. | |
| 9,632,050 B2 | 4/2017 | Zhong et al. | |
| 9,643,460 B2 | 5/2017 | Peine et al. | |
| 9,644,401 B2 | 5/2017 | Nguyen et al. | |
| 9,753,568 B2 | 9/2017 | McMillen | |
| 9,781,825 B2 | 10/2017 | Farkas et al. | |
| 9,824,329 B2 | 11/2017 | Stirling et al. | |
| 9,860,688 B2 | 1/2018 | Kulkami et al. | |
| 10,902,310 B2 | 1/2021 | Khoche | |
| 11,115,732 B2 | 9/2021 | Lucrecio | |
| 11,531,857 B2 * | 12/2022 | Khoche ................... H04W 4/38 |
| 2003/0000128 A1 | 1/2003 | Wood et al. | |
| 2003/0018927 A1 | 1/2003 | Gadir et al. | |
| 2003/0163287 A1 | 8/2003 | Vock et al. | |
| 2004/0044493 A1 | 3/2004 | Coulthard | |
| 2004/0131761 A1 | 7/2004 | Shakespeare | |
| 2006/0100299 A1 | 5/2006 | Malik et al. | |
| 2007/0049291 A1 | 3/2007 | Kim et al. | |
| 2007/0095905 A1 | 5/2007 | Kadaba | |
| 2007/0287473 A1 | 12/2007 | Dupray | |
| 2008/0079567 A1 | 4/2008 | Poor | |
| 2008/0184795 A1 | 8/2008 | Woodard | |
| 2008/0198002 A1 | 8/2008 | Bartholf et al. | |
| 2008/0239282 A1 | 10/2008 | Zou et al. | |
| 2009/0051530 A1 | 2/2009 | Brooks et al. | |
| 2009/0072974 A1 | 3/2009 | Miyashita et al. | |
| 2009/0174600 A1 | 7/2009 | Mazlum et al. | |
| 2009/0192709 A1 | 7/2009 | Yonker et al. | |
| 2009/0196267 A1 | 8/2009 | Walker | |
| 2010/0082870 A1 | 4/2010 | Tokuhara | |
| 2010/0096181 A1 | 4/2010 | Nakamura | |
| 2010/0180701 A1 | 7/2010 | Daniel et al. | |
| 2010/0201519 A1 | 8/2010 | Dagher | |
| 2010/0230498 A1 | 9/2010 | Atherton | |
| 2010/0299401 A1 | 11/2010 | Lloyd | |
| 2011/0054979 A1 | 3/2011 | Cova et al. | |
| 2011/0192465 A1 | 8/2011 | Collings | |
| 2011/0251469 A1 | 10/2011 | Varadan | |
| 2012/0161958 A1 | 6/2012 | Turon et al. | |
| 2012/0271540 A1 | 10/2012 | Miksa et al. | |
| 2012/0278676 A1 | 11/2012 | Teraura | |
| 2013/0039239 A1 | 2/2013 | Lin | |
| 2013/0107770 A1 | 5/2013 | Marsden et al. | |
| 2013/0131980 A1 | 5/2013 | Ginsberg | |
| 2013/0250357 A1 | 9/2013 | Yu | |
| 2014/0014403 A1 | 1/2014 | Miller et al. | |
| 2014/0240088 A1 | 8/2014 | Robinette et al. | |
| 2014/0265915 A1 | 9/2014 | Huang et al. | |
| 2014/0268780 A1 | 9/2014 | Wang | |
| 2014/0274139 A1 | 9/2014 | Bilal et al. | |
| 2014/0317406 A1 | 10/2014 | Lewis et al. | |
| 2015/0034635 A1 | 2/2015 | Dagher | |
| 2015/0154531 A1 | 6/2015 | Skaaksrud | |
| 2015/0324745 A1 | 11/2015 | Goodall | |
| 2015/0347959 A1 | 12/2015 | Skaaksrud | |
| 2015/0349667 A1 | 12/2015 | Andosca et al. | |
| 2015/0354973 A1 | 12/2015 | Wang et al. | |
| 2015/0382154 A1 | 12/2015 | Bilal et al. | |
| 2016/0011074 A1 | 1/2016 | Mian et al. | |
| 2016/0026213 A1 | 1/2016 | Li et al. | |
| 2016/0110085 A1 | 4/2016 | Barton et al. | |
| 2016/0147353 A1 | 5/2016 | Fliz et al. | |
| 2016/0188181 A1 | 6/2016 | Smith | |
| 2016/0205509 A1 | 7/2016 | Hopcraft et al. | |

(56) References Cited

U.S. PATENT DOCUMENTS

| | | |
|---|---|---|
| 2016/0233927 A1 | 8/2016 | Wu |
| 2016/0239801 A1 | 8/2016 | Burch, V et al. |
| 2016/0269533 A1 | 9/2016 | Taylor et al. |
| 2016/0270215 A1 | 9/2016 | Goto |
| 2016/0358444 A1 | 12/2016 | Lundy |
| 2016/0370210 A1 | 12/2016 | Kapusta et al. |
| 2016/0377440 A1 | 12/2016 | Dorum |
| 2017/0017872 A1 | 1/2017 | Kato et al. |
| 2017/0025547 A1 | 1/2017 | Cho et al. |
| 2017/0039666 A1 | 2/2017 | Kuersten et al. |
| 2017/0079144 A1 | 3/2017 | Coleman et al. |
| 2017/0161679 A1 | 6/2017 | Stingel et al. |
| 2017/0337405 A1 | 11/2017 | Schutz |
| 2017/0347940 A1 | 12/2017 | Carr |
| 2018/0003507 A1 | 1/2018 | Arslan et al. |
| 2018/0046964 A1 | 2/2018 | Leoni et al. |
| 2018/0104609 A1 | 4/2018 | Musliner |
| 2018/0165568 A1 | 6/2018 | Khoche |
| 2018/0190096 A1 | 7/2018 | Lundy |
| 2019/0037362 A1 | 1/2019 | Nogueria-Nine |
| 2019/0041836 A1 | 2/2019 | Cella et al. |
| 2019/0066036 A1 | 2/2019 | Roisen |
| 2019/0113632 A1 | 4/2019 | Lucrecio |
| 2019/0250653 A1 | 8/2019 | Conlon |
| 2019/0265082 A1 | 8/2019 | Zafar et al. |
| 2020/0051007 A1 | 2/2020 | Huberman et al. |
| 2020/0072485 A1 | 3/2020 | LaPalme |
| 2020/0098238 A1 | 3/2020 | Skaaksrud |
| 2020/0100115 A1 | 3/2020 | Skaaksrud |
| 2020/0275369 A1 | 8/2020 | Foster et al. |
| 2021/0027122 A1 | 1/2021 | Volkerink et al. |
| 2022/0100263 A1 | 3/2022 | Nagar et al. |

FOREIGN PATENT DOCUMENTS

| | | |
|---|---|---|
| CA | 3061878 A1 | 11/2018 |
| CA | 3008512 A1 | 12/2018 |
| EP | 1786143 A2 | 5/2007 |
| JP | 2008239282 A | 10/2008 |
| JP | 2009230500 A | 10/2009 |
| JP | 2011090670 A | 5/2011 |
| JP | 2012141995 A | 7/2012 |
| WO | 2014195756 A1 | 12/2014 |
| WO | 2016120628 A1 | 8/2016 |
| WO | 2017046699 A1 | 3/2017 |
| WO | 2017100707 A3 | 7/2017 |

OTHER PUBLICATIONS

Dementyev, SensorTape: Modular and Programmable 3D-Aware Dense Sensor Network on a Tape, In Proc. of UIST 2015.

Griffin et al., Adhesive RFID Sensor Patch for Monitoring of Sweat Electrolytes, in IEEE Transactionson Bio-Medical Engineering, Nov. 2014.

Pyo et al., Development of a Map Matching Method Using the Multiple Hypothesis Technique, 2001 IEEE.

Liu, Survey of Wireless Based Indoor Localization Technologies, arXiV:1709.01015v2 [cs.N1] Mar. 14, 2018.

Cheung et al., Least Squares Algorithms for Time-of-Arrival-Based Mobile Location, IEEE Transactions on Signal Processing, vol. 52, No. 4, Apr. 2004, pp. 1121-1128.

Frazier et al., Fully-Drawn Carbon-Based Chemical Sensors on Organic and Inorganic Surfaces, Lab Chip. Oct. 21, 2014; 14(20): 4059-4066. doi:10.1039/c4lc00864b.

Alsheikh et al., Machine Learning in Wireless Sensor Networks: Algorithms, Strategies, and Applications, arXiv:1405.4463v2 [cs.NI] Mar. 19, 2015.

Farooqui et al., A Paper Based Ink Jet Printed Real Time Location Tracking TAB, 2013 IEEE MTT-S International Microwave Symposium Digest (MTT).

Gong et al., Low-Cost Sensor Tape for Environment Sensing Based on Roll-to-Roll Manufacturing Process, In Proc. of IEEE Sensors 2012.

Olyazadeh, Least Square Approach on Indoor Positioning Measurement Techniques, 2012.

Wimmer et al., Modular and Deformable Touch-Sensitive Surfaces Based on Time Domain Reflectometry, UIST 11 Proceedings of the 24th Annual ACM Symposium on User Interface Software and Technology, pp. 517-526, Santa Barbara, CA, USA, Oct. 16-19, 2011.

Olberding et al., A Cuttable Multi-Touch Sensor, Proceeding UIST, 13 Proceedings of the 26th Annual ACM Symposium on User Interface Software and Technology, pp. 245-254, St. Andrews, Scotland, United Kingdom, Oct. 8-11, 2013.

Zhang et al., Deep Neural Networks for Wireless Localization in Indoor and Outdoor Environments, Neurocomputing 194 (2016), pp. 279-287.

Roundy et al., Energy Harvester for Rotating Environments Using Offset Pendulum and Nonlinear Dynamics, Smart Materials and Structures, IOP Publishing Ltd, Sep. 9, 2014.

Ku et al., Joint Power Waveforming and Beamforming for Wireless Power Transfer, IEEE Transactions on Signal Processing, vol. 65,No. 24,Dec. 15, 2017, p. 6409.

PCT Application No. PCT/US2019/042488, International Search Report and Written Opinion, dated Nov. 5, 2019.

Shen et al., A Mobility Framework to Improve Heterogeneous Wireless Network Services, Inderscience Enterprises Ltd., 2011.

Iacono, Wireless Sensor Network Protocols, Universidad De Mendoza, Argentina, 2011.

Matin et al., Overview of Wireless Sensor Network, Intech, 2012 (http://doi.org/10.5772/49376.1).

Cimino et al., Wireless Communication, Identification, and Sensing Technologies Enabling Integrated Logistics: A Study in the Harbor Environment, Research Gate, Oct. 2015 (https://www.researchgate.net/publication/283117890_Wireless_Communication_Identification_and_Sensing_Technologies_Enabling_Integrated_Logistics_A_Study_in_the_Harbor_Environment).

PCT Application No. PCT/US2019/046588, International Search Report and Written Opinion, dated Jan. 6, 2020.

PCT Application No. PCT/2021/053437, International Search Report and Written Opinion dated Jan. 11, 2022, 11 pages.

U.S. Appl. No. 17/449,934 Notice of Allowance dated Jun. 14, 2022, 10 pages.

PCT Application No. PCT/2022/024507, International Search Report and Written Opinion dated Aug. 16, 2022, 10 pages.

U.S. Appl. No. 17/126,796 Non-Final Office Action dated Mar. 24, 2022, 11 pages.

* cited by examiner

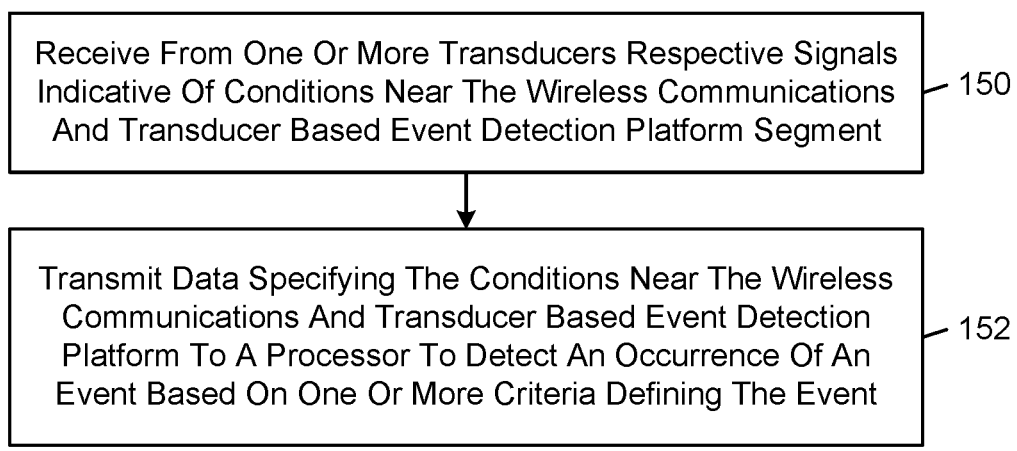
FIG. 9
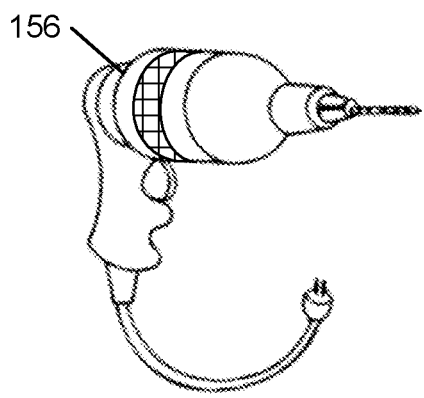
FIG. 10
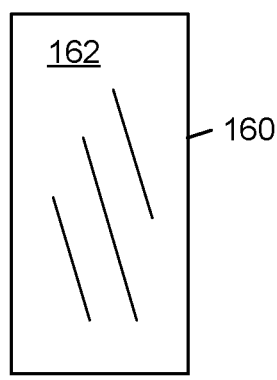
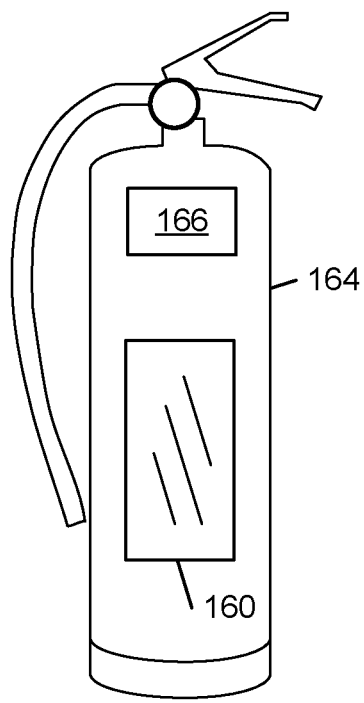
FIG. 11A					FIG. 11B

WIRELESS COMMUNICATIONS AND TRANSDUCER BASED EVENT DETECTION PLATFORM

CROSS-REFERENCE TO RELATED APPLICATIONS

This application is a continuation of U.S. patent application Ser. No. 17/126,796, filed on Dec. 18, 2020. U.S. patent application Ser. No. 17/126,796 is a continuation of U.S. patent application Ser. No. 16/409,589, filed on May 10, 2019, which is a continuation-in-part of U.S. patent application Ser. No. 16/383,353 filed on Apr. 12, 2019, which is a continuation of U.S. patent application Ser. No. 15/842,861, filed on Dec. 14, 2017, now U.S. Pat. No. 10,262,255, which claims priority to U.S. Provisional Patent Application No. 62/434,218, filed on Dec. 14, 2016, and claims priority to U.S. Provisional Patent Application No. 62/435,207, filed on Dec. 16, 2016. U.S. patent application Ser. No. 16/409,589 also claims priority to U.S. Provisional Patent Application No. 62/670,712, filed on May 11, 2018. All of the above-referenced patent applications are incorporated herein in their entirety.

BACKGROUND

This application relates to wireless communications and transducer platforms.

SUMMARY

This specification describes a low-cost, multi-function adhesive wireless communications and transducer platform (also referred to herein as the "adhesive product") with a form factor that unobtrusively integrates one or more transducers and one or more wireless communication devices in an adhesive product system.

In an aspect, the adhesive product system integrates transducer and wireless communication components within a flexible adhesive structure in a way that not only provides a cost-effective platform for interconnecting, optimizing, and protecting the constituent components but also maintains the flexibility needed to function as an adhesive product that can be deployed seamlessly and unobtrusively into various applications and workflows, including sensing, notification, security, and object tracking applications, and asset management workflows such as manufacturing, storage, shipping, delivery, and other logistics associated with moving products and other physical objects.

The adhesive wireless communications and transducer platform can have a variety of form factors, including a multilayer roll or sheet that includes a plurality of divisible adhesive segments each of which is equipped with wireless communications and transducing functionalities. Once deployed, each adhesive segment can function, for example, as an adhesive tape, label, sticker, decal, or the like and, at the same time, as an inconspicuous smart wireless communicator with transducing (e.g., sensing) functionality.

In an example, an adhesive segment includes a transducer configured to receive an input stimulus and generate an output signal based on the sensed input stimulus. The input stimulus may be any type of detectable physical stimulus, including for example, electromagnetic waves such as visible light, capacitance, magnetism, sound, heat, pressure, force, torque, motion, acceleration, position, humidity, a substance such as a chemical or compound, and others.

In an example, an adhesive segment includes an output transducer configured to receive an input signal and produce an output stimulus based on the received input signal. The input signal may be any type of signal that is compatible with the output transducer, including digital and analog electrical signals (e.g., alternating current, direct current, Global Positioning System (GPS) coordinates, etc.), one or more mechanical linkages controlling an actuator, such as a valve, etc.

In an example, an adhesive segment can track location information either autonomously or collectively with other activated segments. In an autonomous mode of operation, an adhesive segment can be configured to communicate with a variety of different wireless locationing systems and equipment to determine or assist in determining information relating to its geographic or relative location. In a collective mode of operation, a set of segments can additionally communicate with one another to self-organize and self-configure into, for example, a mesh network and, thereby, create mechanisms or opportunities for acquiring and/or sharing acquired location information in or across areas that are not supported by existing infrastructure equipment.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DESCRIPTION OF DRAWINGS

FIG. 9 is a flow diagram of an example process for detecting the occurrence of an event proximate an adhesive wireless communications and transducer platform.

FIG. 10 is a diagrammatic view of an example adhesive wireless communications and transducer platform adhered to an example of construction equipment.

FIG. 11A is a diagrammatic view of an example adhesive wireless communications and transducer platform that includes a light reflective surface.

FIG. 11B is a diagrammatic view of examples of the adhesive wireless communications and transducer platform of FIG. 11A mounted on a fire extinguisher.

DETAILED DESCRIPTION

Figure 1A:
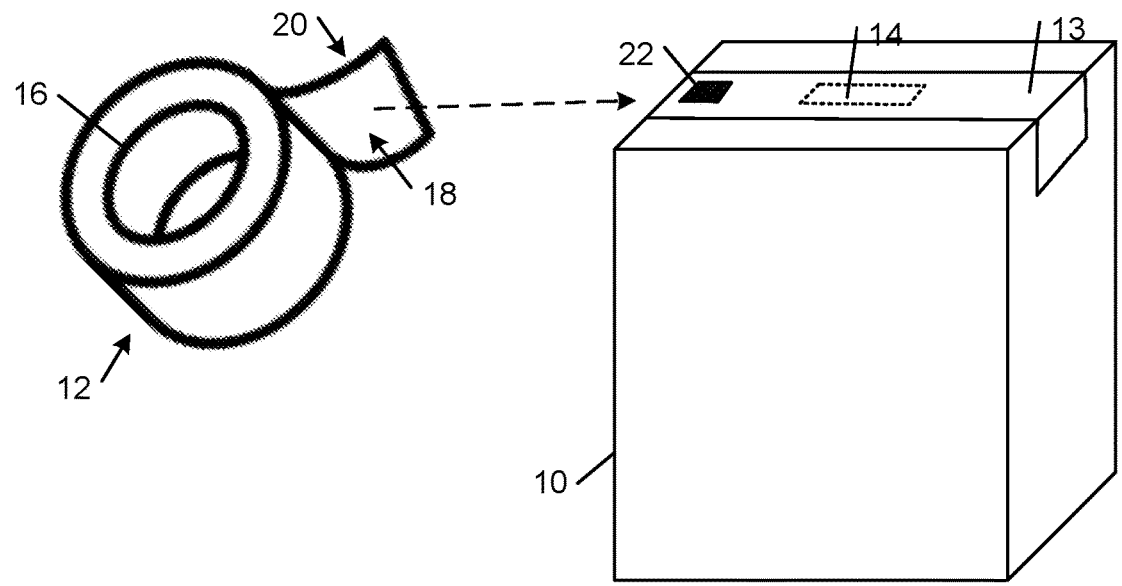
FIG. 1A is a diagrammatic view of a package that has been sealed for shipment using a segment of an example adhesive wireless communications and transducer platform dispensed from a roll.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

In the instant specification, an adhesive wireless communications and transducer platform is described that includes a plurality of segments that can be separated from the adhesive product (e.g., by cutting, tearing, peeling, or the like) and adhesively attached to a variety of different surfaces to inconspicuously implement any of a wide variety of different wireless communications based transducing (e.g., sensing, emitting, etc.) applications. Examples of such applications include: event detection applications, monitoring applications, security applications, notification applications, and tracking applications, including inventory tracking, package tracking, person tracking, animal (e.g., pet) tracking, manufacturing parts tracking, and vehicle tracking. In example embodiments, each segment of an adhesive product is equipped with an energy source, wireless communication functionality, transducing functionality, and processing functionality that enable the segment to perform one or more transducing functions and report the results to a remote server or other computer system. The components of the adhesive wireless communications and transducer platform system are encapsulated within a flexible adhesive structure that protects the components from damage while maintaining the flexibility needed to function as an adhesive product (e.g., an adhesive tape or label) for use in various applications and workflows. In addition to single function applications, example embodiments also include multiple sensors that extend the utility of the platform by providing supplemental information regarding characteristics of the state and or environment of, for example, an article, object, vehicle, or person, over time.

The instant specification also describes systems and processes for fabricating flexible multifunction adhesive products in efficient and low-cost ways. In addition to using roll-to-roll and/or sheet-to-sheet manufacturing techniques, the fabrication systems and processes are configured to optimize the placement and integration of components within the flexible adhesive structure to achieve high flexibility and ruggedness. In this way, these fabrication systems and processes are able to create useful and reliable adhesive products that can provide ambient sensing functionality, including locationing functionality. This functionality together with the low cost of production is expected to encourage the ubiquitous deployment of adhesive product segments and thereby alleviate at least some of the problems arising from gaps in conventional infrastructure coverage that prevent continuous monitoring, event detection, security, and tracking applications across heterogeneous environments.

FIG. 1A shows an example package 10 that is sealed for shipment using an example adhesive wireless communications and transducer platform 12 that includes embedded transducing components 14. In this example, a segment 13 of the adhesive wireless communications and transducer platform 12 is dispensed from a roll 16 and applied to the package 10. The adhesive wireless communications and transducer platform 12 includes an adhesive side 18 and a non-adhesive side 20. The adhesive wireless communications and transducer platform 12 can be dispensed from the roll 16 in the same way as any conventional packing tape, shipping tape, or duct tape. For example, the adhesive wireless communications and transducer platform 12 may be dispensed from the roll 16 by hand, laid across the seam where the two top flaps of the package 10 meet, and cut to a suitable length either by hand or using a cutting instrument (e.g., scissors or an automated or manual tape dispenser). Examples of such tapes include tapes have non-adhesive sides 20 that carry one or more coatings or layers (e.g., radiation reflective or radiation absorbing coatings or layers).

Figure 1B:
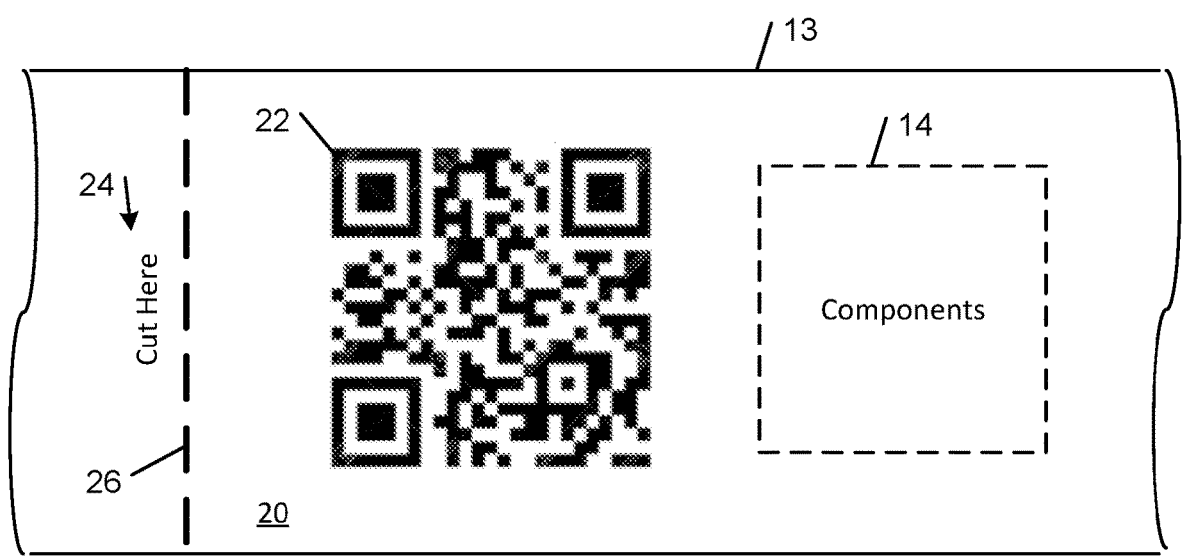
FIG. 1B is a diagrammatic top view of a portion of the segment of the example adhesive wireless communications and transducer platform shown in FIG. 1A.

Referring to FIG. 1B, in some examples, the non-adhesive side 20 of the segment 13 of the adhesive product 12 includes writing or other markings that may convey instructions, warnings, or other information to a person or machine (e.g., a bar code reader), or may simply be decorative and/or entertaining. In the illustrated example, the segment 13 of the adhesive wireless communications and transducer platform 12 includes a two-dimensional bar code 22, written instructions 24 (i.e., "Cut Here"), and an associated cut line 26 that indicates where the user should cut the adhesive wireless communications and transducer platform 12. The written instructions 24 and the cut line 26 typically are printed or otherwise marked on the top, non-adhesive surface 20 of the adhesive wireless communications and transducer platform 12 during manufacture. The two-dimensional bar code 22, on the other hand, may be marked on the non-adhesive surface 20 of the adhesive wireless communications and transducer platform 12 during the manufacture of the adhesive product 12 or, alternatively, may be marked on the non-adhesive surface 20 of the adhesive wireless communications and transducer platform 12 as needed using, for example, a printer or other marking device.

In order to avoid damage to the tracking functionality of the segments of the adhesive wireless communications and transducer platform 12, the cut lines 26 typically demarcate the boundaries between adjacent segments at locations that are free of any transducing components 14. The spacing between the transducing components 14 and the cut lines 26 may vary depending on the intended application or the intended adhesive application. In the example illustrated in FIG. 1A, the length of the adhesive wireless communications and transducer platform 12 that is dispensed to seal the package 10 corresponds to a single segment of the adhesive wireless communications and transducer platform 12. In other examples, the length of adhesive wireless communications and transducer platform 12 needed to seal a package or otherwise serve the adhesive function for which the adhesive wireless communications and transducer platform is being applied may include multiple segments 13 of the adhesive wireless communications and transducer platform 12, one or more of which segments 13 may be activated upon cutting the length of the adhesive wireless communications and transducer platform 12 from the roll 16 and/or applying the length of the adhesive wireless communications and transducer platform to the package 10.

In some examples, the transducing components 14 embedded in one or more segments 13 of the adhesive wireless communications and transducer platform 12 are activated when the adhesive product 12 is cut along the cut line 26. In these examples, the adhesive wireless communications and transducer platform 12 includes one or more embedded energy sources (e.g., thin film batteries or conventional cell batteries, such as conventional watch style batteries, rechargeable batteries, or other rechargeable energy storage devise, such as a super capacitor or charge pump) that supply power to the transducing components 14 in one or more segments of the adhesive wireless communications and transducer platform 12 in response to being separated from the adhesive product 12 (e.g., along a cut line 26).

In some examples, each segment 13 of the adhesive wireless communications and transducer platform 12 includes its own respective energy source. In some of these examples, each energy source is configured to only supply power to the components in its respective adhesive wireless communications and transducer platform segment regardless of the number of contiguous segments 13 that are in a given length of adhesive wireless communications and transducer platform 12. In other examples, when a given length of the adhesive wireless communications and transducer platform 12 includes multiple segments 13, the energy sources in the respective segments 13 are configured to supply power to the transducing components 14 in all of the segments 13 in the given length of the adhesive wireless communications and transducer platform 12. In some of these examples, the energy sources are connected in parallel and concurrently activated to power the transducing components 14 in all of the segments 13 at the same time. In other ones of these examples, the energy sources are connected in parallel and alternately activated to power the transducing components 14 in respective ones of the adhesive wireless communications and transducer platform segments 13 at different time periods, which may or may not overlap.

Figure 2A:
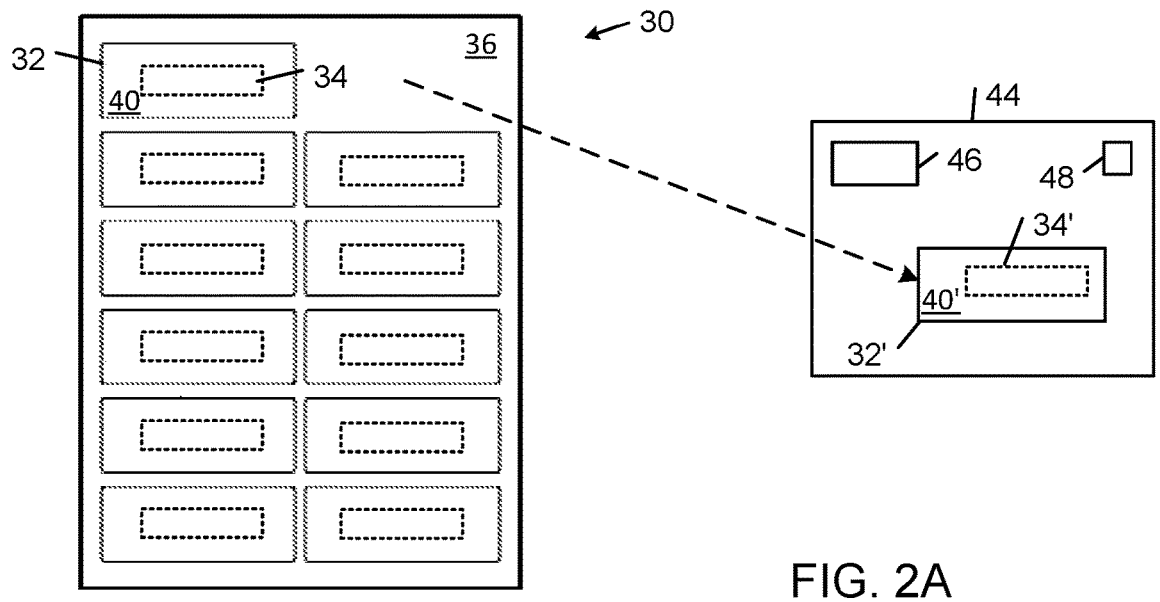
FIG. 2A is a diagrammatic view of an example of an envelope carrying a segment of an example adhesive wireless communications and transducer platform dispensed from a backing sheet.

FIG. 2A shows an example adhesive wireless communications and transducer platform 30 that includes a set of adhesive segments 32 each of which includes a respective set of embedded transducing components 34, and a backing sheet 36 with a release coating that prevents the adhesive segments 32 from adhering strongly to the backing sheet 36. Each segment 32 includes an adhesive side facing the backing sheet 36, and an opposing non-adhesive side 40. In this example, a particular segment 32' of the adhesive wireless communications and transducer platform 30 has been removed from the backing sheet 36 and affixed to an envelope 44. Each segment 32 of the adhesive wireless communications and transducer platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, the adhesive product segment components 34 that are embedded in a segment 32 of the adhesive wireless communications and transducer platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive product 30 includes one or more embedded energy sources (e.g., thin film batteries, common disk-shaped cell batteries, or rechargeable batteries or other energy storage devices, such as a super capacitor or charge pump) that can be configured to supply power to the adhesive product segment components 34 in the segment 32 in response to the detection of a change in capacitance between the segment 32 and the backing sheet 36 as a result of removing the segment 32 from the backing sheet 36.

Figure 2B:
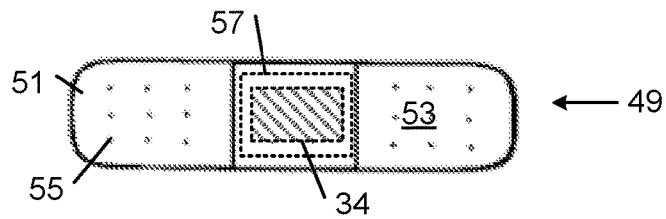
FIG. 2B is a diagrammatic top view of an example adhesive wireless communications and transducer platform implemented as an adhesive bandage.

FIG. 2B shows a top view of an example adhesive wireless communications and transducer platform implemented as an adhesive bandage 49. The adhesive bandage 49 includes a flexible layer 51 having a top side 53 and a bottom side (not shown). The top side 53 includes a flexible surface with a plurality of perforations 55. The bottom side includes a protective layer 57 in a central region of the bottom side of the adhesive bandage 49. The protective layer 57 typically includes gauze or a similar type of absorbent material. The bottom side also includes adhesive regions on either side of the central region 57. In the illustrated example, the adhesive product segment components 34 are embedded in one or more layers between the flexible layer 51 and the protective layer 57 of the adhesive bandage 49.

Figure 3:
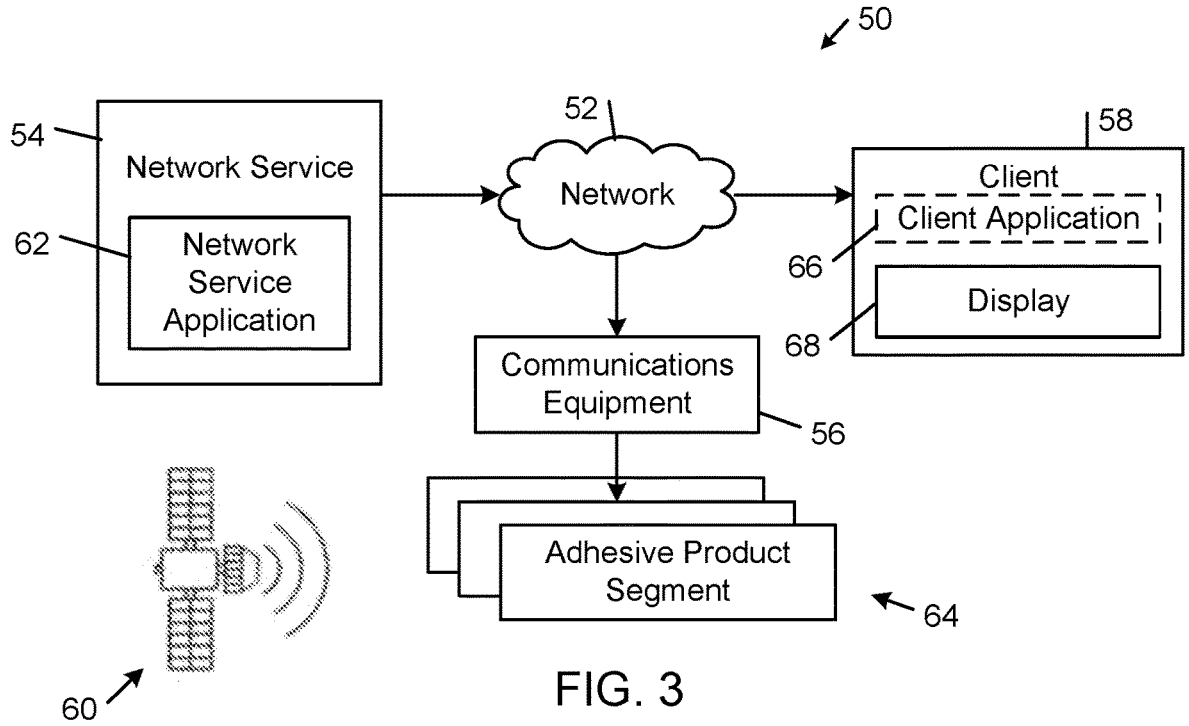
FIG. 3 is a diagrammatic view of an example of a network environment supporting communications with segments of an adhesive wireless communications and transducer platform.

FIG. 3 shows an example network environment 50 that includes a network 52 that supports communications between a network service 54, communications equipment 56, and a client device 58. The network 52 includes one or more network communication systems and technologies, including any one or more of wide area networks, local area networks, public networks (e.g., the internet), private networks (e.g., intranets and extranets), wired networks, and wireless networks. The communications equipment 56 includes any one or more of (i) satellite based tracking systems 60 (e.g., GPS, GLONASS, and NAVSTAR) that transmit geolocation data that can be received by suitably equipped receivers in segments of an adhesive wireless communications and transducer platform, (ii) cellular based systems that use mobile communication technologies (e.g., GSM, GPRS, CDMA, etc.) to implement one or more cell-based localization techniques, and (iii) communications equipment 56, such as wireless access points (e.g., Wi-Fi nodes, Bluetooth nodes, ZigBee nodes, etc.) and other shorter range localization technologies (e.g., ultrasonic localization and/or dead reckoning based on motion sensor measurements).

As explained in detail below, location data for one or more activated adhesive wireless communications and transducer platform segments 64 can be obtained using one or more of the communications systems and technologies described above.

For example, an adhesive wireless communications and transducer platform segment 64 that includes a GPS receiver is operable to receive location data (e.g., geolocation data) from the Global Positioning System (GPS). In this process, the adhesive wireless communications and transducer platform segment 64 periodically monitors signals from multiple GPS satellites. Each signal contains information about the time the signal was transmitted and the position of the satellite at the time of transmission. Based on the location and time information for each of four or more satellites, the GPS receiver determines the geolocation of the adhesive wireless communications and transducer platform segment 64 and the offset of its internal clock from true time. Depending on its configuration, the adhesive wireless communications and transducer platform segment 64 can either forward the received GPS location data to the network service 54 to determine its geolocation, or first compute geolocation coordinates from the received GPS location data and report the computed geolocation coordinates to the network service 54. However, the adhesive wireless communications and transducer platform segment 64 can only determine its GPS location when it is able to receive signals from at least four GPS satellites at the same time. As a result, GPS localization typically is limited or unavailable in urban environments and indoor locations.

Instead of or in addition to GPS localization, an adhesive wireless communications and transducer platform segment 64 can be configured to determine or assist in determining its location using terrestrial locationing techniques. For example, Received Signal Strength Indicator (RSSI) techniques may be used to determine the location of an adhesive wireless communications and transducer platform segment 64. These techniques include, for example, fingerprint matching, trilateration, and triangulation. In an example RSSI fingerprinting process, one or more predetermined radio maps of a target area are compared to geo-reference RSSI fingerprints that are obtained from measurements of at least three wireless signal sources (e.g., cellular towers or wireless access points) in the target area to ascertain the location of the adhesive wireless communications and transducer platform segment 64. The predetermined radio maps typically are stored in a database that is accessible by the network service 54. In example RSSI triangulation and trilateration processes, the location of an adhesive wireless communications and transducer platform segment 64 can be determined from measurements of signals transmitted from at least three omnidirectional wireless signal sources (e.g., cellular towers or wireless access points). Examples of the triangulation and trilateration localization techniques may involve use of one or more of time of arrival (TOA), angle of arrival (AOA), time difference of arrival (TDOA), and uplink-time difference of arrival (U-TDOA) techniques. RSSI fingerprint matching, trilateration, and triangulation techniques can be used with cellular and wireless access points that are configured to communicate with any of a variety of different communication standards and protocols, including GSM, CDMA, Wi-Fi, Bluetooth, Bluetooth Low Energy (BLE), LoRa, ZigBee, Z-wave, and RF.

In some examples, an adhesive wireless communications and transducer platform segment 64 that includes a GSM/GPRS transceiver can scan GSM frequency bands for signals transmitted from one or more GSM cellular towers. For each signal received by the adhesive wireless communications and transducer platform segment 64, the adhesive wireless communications and transducer platform segment 64 can determine the signal strength and the identity of the cellular tower that transmitted the signal. The adhesive wireless communications and transducer platform segment 64 can send the signal strength and transmitter identifier to the network service 54 to determine the location of the adhesive product segment 64. If signal strength and transmitter identifier is available from only one cellular tower, the network service 54 can use nearest neighbor localization techniques to determine the location of the adhesive wireless communications and transducer platform segment 64. If signal strength and transmitter identifier is received from two or more cellular towers, the network service 54 can use localization techniques, such as fingerprint matching, trilateration, and triangulation, to calculate the position of the adhesive wireless communications and transducer platform segment 64.

In some examples, an adhesive wireless communications and transducer platform segment 64 that includes a Wi-Fi (Wireless-Fidelity) transceiver can scan Wi-Fi frequency bands for signals transmitted from one or more Wi-Fi access points. For each signal received by the adhesive wireless communications and transducer platform segment 64, the adhesive wireless communications and transducer platform segment 64 can determine the signal strength and the identity of the access point that transmitted the signal. The adhesive wireless communications and transducer platform segment 64 can send the signal strength and transmitter identifier information to the network service 54 to determine the location of the adhesive product segment 64. If signal strength and transmitter identifier information is available from only one Wi-Fi access point, the network service 54 can use nearest neighbor localization techniques to determine a location of the adhesive product segment 64. If signal strength and transmitter identifier information is received from two or more Wi-Fi access points, the network service 54 can use localization techniques, such as trilateration, and triangulation, to calculate the position of an adhesive product segment 64. RSSI fingerprint matching also can be used to determine the location of the adhesive wireless communications and transducer platform segment 64 in areas (e.g., indoor and outdoor locations, such as malls, warehouses, airports, and shipping ports) for which one or more radio maps have been generated.

In some examples, the wireless transceiver in the adhesive wireless communications and transducer platform segment 64 can transmit a wireless signal (e.g., a Wi-Fi, Bluetooth, Bluetooth Low Energy, LoRa, ZigBee, Z-wave, and/or RF signal) that includes the identifier of the adhesive wireless communications and transducer platform segment 64. The wireless signal can function as a beacon that can be detected by a mobile computing device (e.g., a mobile phone) that is suitably configured to ascertain the location of the source of the beacon. In some examples, a user (e.g., an operator affiliated with the network service 54) may use the mobile computing device to transmit a signal into an area (e.g., a warehouse) that includes the identifier of a target adhesive wireless communications and transducer platform segment 64 and configures the target adhesive wireless communications and transducer platform segment 64 to begin emitting the wireless beacon signal. In some examples, the target adhesive wireless communications and transducer platform segment 64 will not begin emitting the wireless beacon signal until the user/operator self-authenticates with the network service 54.

The network service 54 includes one or more computing resources (e.g., server computers) that can be located in the same or different geographic locations. The network service may execute one or more of a variety of different applications, including event detection applications, monitoring applications, security applications, notification applications, and tracking/locationing applications.

In one example, the network service 54 executes a locationing application 62 to determine the locations of activated adhesive wireless communications and transducer platform segments 64. In some examples, based on execution of the locationing application 62, the network service 54 receives location data from one or more of the adhesive product segments 64. In some examples, the network service 54 processes the data received from adhesive wireless communications and transducer platform segments 64 to determine the physical locations of the adhesive wireless communications and transducer platform segments 64. For example, the adhesive product segments 64 may be configured to obtain locationing information from signals received from a satellite system (e.g., GPS, GLONASS, and NAVSTAR), cell towers, or wireless access points, and send the locationing information to the network service 54 to ascertain the physical locations of the adhesive wireless communications and transducer platform segments 64. In other examples, the adhesive wireless communications and transducer platform segments 64 are configured to ascertain their respective physical locations from the signals received from a satellite system (e.g., GPS, GLONASS, and NAVSTAR), cell towers, or wireless access points, and to transmit their respective physical locations to the network service 54. In either or both cases, the network service 54 typically stores the locationing information and/or the determined physical location for each adhesive wireless communications and transducer platform segment in association with the respective unique identifier of the adhesive wireless communications and transducer platform segment. The stored data may be used by the network service 54 to determine time, location, and state (e.g., sensor based) information about the adhesive wireless communications and transducer platform segments 64 and the objects or persons to which the adhesive wireless communications and transducer platform segments 64 are attached. Examples of such information include tracking the environmental conditions or state of the current location of an adhesive wireless communications and transducer platform segment 64, determining the physical route traveled by the adhesive wireless communications and transducer platform segment 64 over time, and ascertaining stopover locations and durations.

As shown FIG. 3, the client device 58 includes a client application 66 and a display 68. The client application 66 establishes sessions with the network service 54 during which the client application obtains information regarding the states (e.g., locations) and events relating to the adhesive wireless communications and transducer platform segments 64. In some examples, a user of the client device 58 must be authenticated before accessing the network service 54. In this process, the user typically presents multiple authentication factors to the system (e.g., user name and password). After the user is authenticated, the network service 54 transmits to the client device 58 data associated with the user's account, including information relating to the adhesive wireless communications and transducer platform segments 64 that are associated with the user's account. The information may include, for example, the state (e.g., current location) and events relating to a particular adhesive wireless communications and transducer platform segment 64, the physical route traveled by the adhesive wireless communications and transducer platform segment 64 over time, stopover locations and durations, and state and/or changes in state information (as measured by one or more sensors associated with the adhesive wireless communications and transducer platform segment 64). The information may be presented in a user interface on the display 68. State information (including location) may be presented in the user interface in any of a variety of different ways, including in a table, chart, or map. In some examples, the location and state data presented in the user interface are updated in real time.

Figure 4:
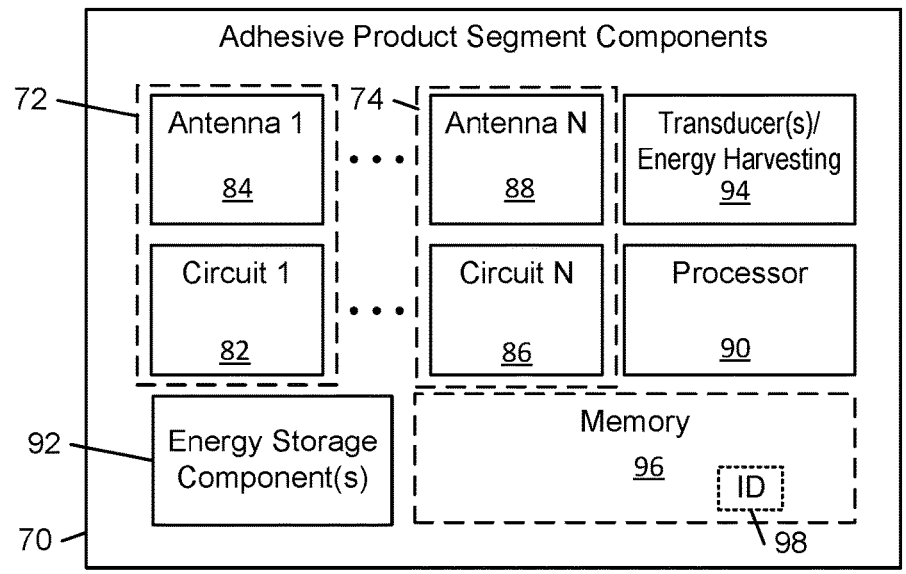
FIG. 4 is a schematic view of an example segment of an adhesive wireless communications and transducer platform.

FIG. 4 shows a block diagram of the components of an example segment 70 of an adhesive wireless communications and transducer platform 64. The adhesive wireless communications and transducer platform segment 70 includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The adhesive wireless communications and transducer platform segment 70 also includes a processor 90 (e.g., a microcontroller or microprocessor), one or more energy storage devices 92 (e.g., non-rechargeable or rechargeable printed flexible battery, conventional single or multiple cell battery, or a super capacitor or charge pump), one or more transducers 94 (e.g., stimulus sensors and/or emitters, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a light sensor (e.g., a photodiode or a camera), a sound sensor (e.g., a microphone), a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), and a humidity sensor. Examples of emitting transducers 94 include light emitting components (e.g., light emitting diodes and displays, electro-acoustic transducers (e.g., audio speakers), electric motors, and thermal radiators (e.g., an electrical resistor or a thermoelectric cooler).

In some examples, the adhesive wireless communications and transducer platform segment 70 includes a memory 96 for storing data (e.g., state, event, and localization data, and a unique identifier 98 associated with the segment 70). In some examples, the memory 96 may be incorporated into one or more of the processor 90 or sensors 94, or may be a separate component that is integrated in the adhesive wireless communications and transducer platform segment 70 as shown in FIG. 4.

Figure 5A:
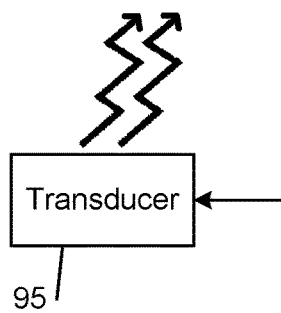
FIG. 5A is a diagrammatic view of an example transducer converting input energy received from an energy storage component to output energy.

Referring to FIG. 5A, in some examples, the one or more transducers 94 include one or more energy emitting transducers 95 that convert input power from an energy storage component 97 into output power. Example energy emitting components of the adhesive wireless communications and transducer platform include an optical emitter (e.g., a light emitting diode, a laser, etc.), an acoustic emitter (e.g., a loudspeaker), an electromagnetic wave emitter, and an odor emitter.

Figure 5B:
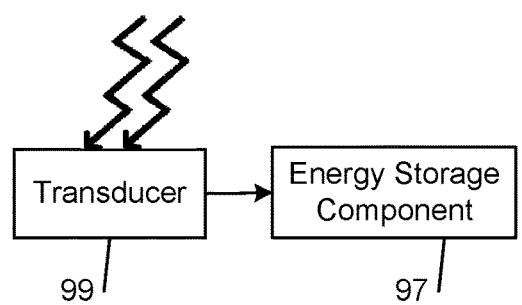
FIG. 5B is a diagrammatic view of an example transducer converting energy received from an external source to energy for charging an energy storage component.

Referring to FIG. 5B, in some examples, the one or more transducers 94 include one or more energy absorbing transducers 99 that convert input energy into electrical energy used to charge the energy storage component 97. Example energy harvesting components of the adhesive wireless communications and transducer platform for recharging the one or more energy storage components 92 include at least one of electromagnetic wave harvesting (e.g., an electromagnetic wave detector (e.g., a radio frequency (RF) energy harvesting coil transducer), solar cell or photovoltaic harvesting, vibration harvesting, piezoelectric based harvesting, and sound (e.g., ultrasound) harvesting.

Because battery power is finite and the power needs of any particular adhesive wireless communications and transducer platform segment generally is unknown, some examples of the adhesive wireless communications and transducer platform segments are preconfigured in a power-off state and to remain in the power-off state until a predetermined event occurs. In some cases, the predetermined event indicates that the adhesive product segment has been deployed for use in the field. Example events include cutting a segment of an adhesive wireless communications and transducer platform from a roll, bending a segment of an adhesive wireless communications and transducer platform as it is being peeled off of a roll, separating a segment of an adhesive wireless communications and transducer platform from a sheet, and detecting a change in state of the adhesive wireless communications and transducer platform.

Each segment 70 of the adhesive wireless communications and transducer platform 64 integrates components of a tracking system with a flexible adhesive structure in a way that not only provides a cost-effective platform for interconnecting, optimizing, and protecting the components of the tracking system but also maintains the flexibility needed to function as a flexible adhesive product (e.g., a functional flexible tape or label) that can be deployed seamlessly and unobtrusively into various applications and workflows, including event detection application, monitoring applications, security applications, notification applications, and person and object tracking applications, and asset management workflows such as manufacturing, storage, delivery, and other logistics associated with products and other physical objects. In addition, in order to encourage the ubiquitous deployment of adhesive wireless communications and transducer platform segments, the disclosed adhesive wireless communications and transducer platforms are designed to be fabricated using cost-effective fabrication methods, including roll-to-roll and sheet-to-sheet fabrication processes.

In this regard, the components of an adhesive wireless communications and transducer platform 64 are designed and arranged to optimize performance, flexibility, and robustness for each target application. This encompasses factors, such as material selection, component layout, and mechanical integrity of the integrated system. To this end, electronic design automation tools are used to optimize the design across the constituent layers of an adhesive wireless communications and transducer platform given prescribed performance targets (e.g., mechanical integrity targets, electrical performance targets, and/or wireless communication performance targets). This includes simulations of electromagnetic wave behavior across layers, heat dissipation behavior, electrical parasitic behavior across layers (e.g., inductances, capacitances, and resistances), and mechanical behaviors (e.g., the impact of bending and impressing bonding patterns on the adhesive wireless communications and transducer platform 64). Based on these simulations, process technology design rules are developed for designing adhesive wireless communications and transducer platforms, including rules for integrating layers, rules for selecting the number of layers, and rules for selecting the types of layers (e.g., through interposer vias, component layers, cover layers, substrate layers, and adhesive layers). In some examples, design rules are developed regarding the layout of components in the different layers of an adhesive wireless communications and transducer platform 64. For example, minimum spacing and/or proximity rules are developed for the placement of antennas, rigid components, flexible components, passive components, and active components. In these examples, rigid and active components, such as the communication circuits 82, 86 (e.g., receivers, transmitters, and transceivers) and the processor 90, can have larger minimum spacing requirements than flexible and passive components. In some examples, rigid components are spaced apart according to minimum spacing rules to satisfy mechanical integrity and flexibility performance targets. In some examples, active components are laid out according to minimum spacing rules to satisfy heat dissipation performance targets. In some examples, design rules are developed for hierarchical assembly of an adhesive wireless communications and transducer platform by integrating smaller adhesive wireless communications and transducer platform components to form a larger integrated adhesive wireless communications and transducer platform system.

Figure 6:
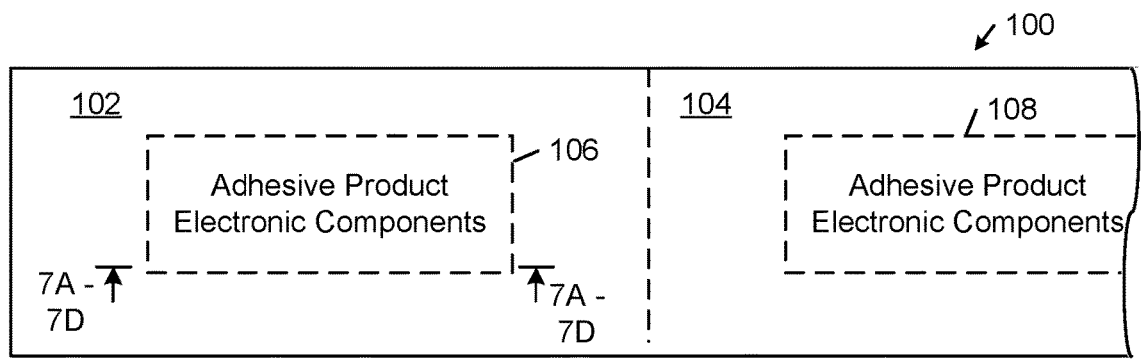
FIG. 6 is a diagrammatic top view of a length of an example adhesive wireless communications and transducer platform.

FIG. 6 shows a top view of a portion of an example adhesive wireless communications and transducer platform 100 that includes a first segment 102 and a portion of a second segment 104. Each segment 102, 104 of the adhesive wireless communications and transducer platform 100 includes a respective set 106, 108 of the wireless adhesive product segment components 70. The segments 102, 104 and their respective sets of components 106, 108 typically are identical and configured in the same way. In some other embodiments, however, the segments 102, 104 and/or their respective sets of tracking components 106, 108 are different and/or configured in different ways. For example, in some examples, different sets of the segments of the adhesive wireless communications and transducer platform 100 may have different sets or configurations of tracking components that are designed and/or optimized for different applications, or different sets of adhesive wireless communications and transducer platform segments may have different ornamentations (e.g., markings on the exterior surface of the platform and/or different (e.g., alternating) lengths.

An example method of fabricating the adhesive wireless communications and transducer platform 100 (see FIG. 5)

according to a roll-to-roll fabrication process, is described in connection with FIGS. 6, 7A, and 7B of U.S. patent application Ser. No. 15/842,861, filed Feb. 20, 2017, which is incorporated herein by reference.

Figure 7A:
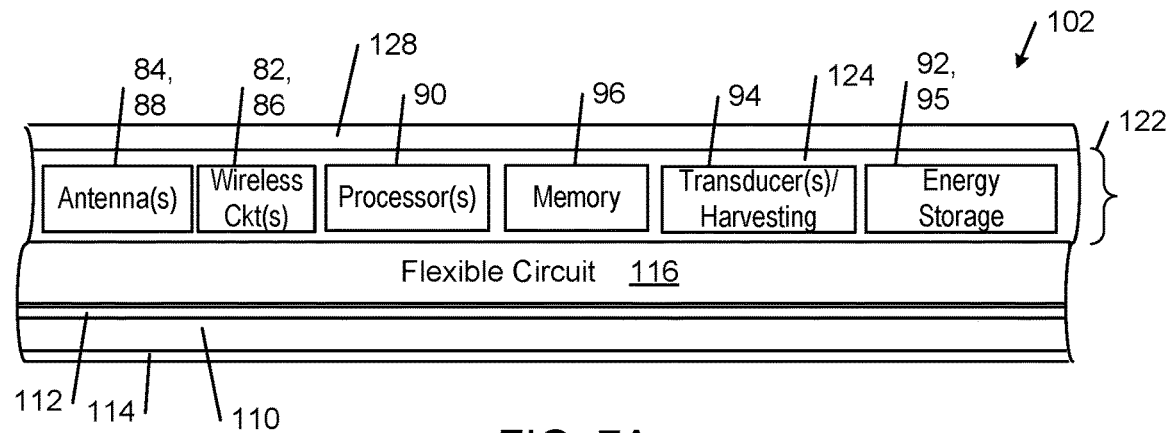
FIGS. 7A-7D show diagrammatic cross-sectional side views of portions of different respective adhesive wireless communications and transducer platforms.

FIG. 7A shows a cross-sectional side view of a portion of an example segment 102 of the adhesive wireless communications and transducer platform 100 that includes a respective set of the components 106. The adhesive wireless communications and transducer platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam tape) that has a high bond strength sufficient to prevent removal of the adhesive segment 102 from a surface on which the adhesive layer 114 is adhered without destroying the integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive wireless communications and transducer platform 100. The adhesive layer 112 bonds the flexible substrate 110 to a bottom surface of a flexible circuit 116, that includes one or more wiring layers (not shown) that connect the processor 90, the wireless circuit(s) 82, 86, the antenna(s) 84, 88, the transducer(s) 94, the memory 96, and other components in a device layer 122 to each other and to the energy storage/harvesting component(s) 92 and, thereby, enable the transducing, tracking and other functionalities of the adhesive wireless communications and transducer platform segment 102. In some examples, a flexible polymer layer 124 encapsulates the device layer 122 and thereby reduces the risk of damage that may result from the intrusion of contaminants and/or liquids (e.g., water). The flexible polymer layer 124 also planarizes the device layer 122. This facilitates optional stacking of additional layers on the device layer 122 and also distributes forces generated in, on, or across the adhesive wireless communications and transducer platform segment 102 so as to reduce potentially damaging asymmetric stresses that might be caused by the application of bending, torqueing, pressing, or other forces on the adhesive wireless communications and transducer platform segment 102 during use. In some examples, a flexible cover 128 is bonded to the planarizing polymer 124 by an adhesive layer (not shown).

The flexible cover 128 and the flexible substrate 110 may have the same or different compositions depending on the intended locationing application. The flexible cover 126 and the flexible substrate 110 typically include flexible film layers and/or paper substrates, which may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, these adhesive layers are applied to the flexible cover 128 and the flexible substrate 110 during manufacture of the adhesive wireless communications and transducer platform 100 (e.g., during a roll-to-roll or sheet-to-sheet fabrication process). In other examples, the flexible cover 126 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 122 is composed of a flexible epoxy (e.g., silicone).

In some examples, the energy storage device 92 is a flexible battery that includes a printed electrochemical cell that includes a planar arrangement of an anode and a cathode and battery contact pads. In some examples, the flexible battery may include lithium-ion cells or nickel-cadmium electro-chemical cells. The flexible battery typically is formed by process that includes printing or laminating the electro-chemical cells on a flexible substrate (e.g., a polymer film layer). In some examples, other components may be integrated on the same substrate as the flexible battery. For example, one or more of the flexible antennas 84, 88, the circuits 82, 86, 120, and/or the processor(s) 90 may be integrated on the flexible battery substrate. In some examples, one or more of these other components also (e.g., the flexible antennas and the flexible interconnect circuits) may be printed on the flexible battery substrate.

In some examples, the flexible circuit 120 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example adhesive wireless communications and transducer platform segment 102 shown in FIG. 7A, the flexible circuit 116 is a single access flex circuit that interconnects the components of the adhesive wireless communications and transducer platform on a single side of the flexible circuit 116. In other examples, the flexible circuit 116 is a double access flex circuit that includes a front-side conductive pattern that interconnects the communication systems 72, 74, the processor 90, the one or more sensors 94, and the memory 96, and allows through-hole access (not shown) to a back-side conductive pattern that is connected to the flexible battery (not shown). In these examples, the front-side conductive pattern of the flexible circuit 120 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the sensors) on the front-side of the flexible circuit 120 to the electrodes of the flexible battery 116 via one or more through holes in the substrate of the flexible circuit 120.

Figure 7B:
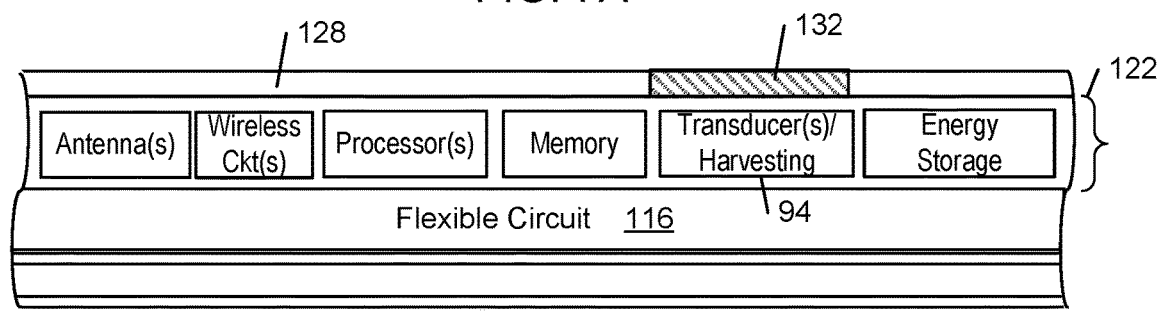
Figure 7C:
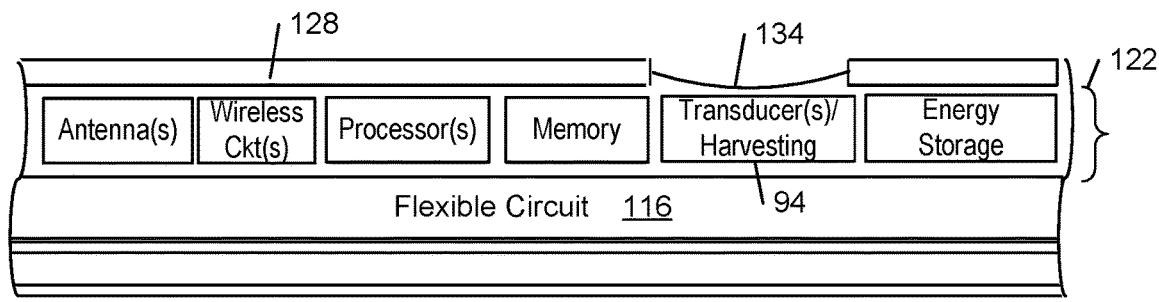
Figure 7D:
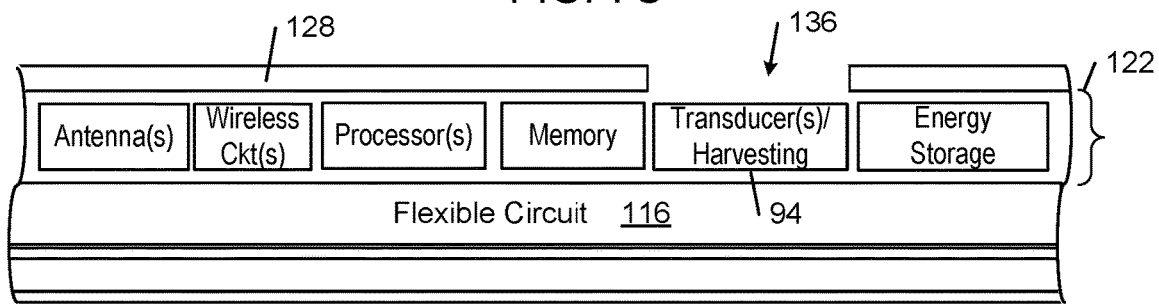

FIGS. 7B-7D show examples in which the cover layer 128 of the adhesive wireless communications and transducer platform 100 includes regions over one or more of the transducers 94 that have properties, characteristics, or features that are designed to improve the operating performance of the platform 100 for specific applications.

FIG. 7B shows an example of the cover 128 that includes an opening containing a window 132 positioned over one or more of the transducers 94. In an example, the one or more transducers include a light sensor (e.g., a photodiode or a camera), and the window 132 is optically transparent to light within the wavelength ranges detectable by the light sensor. In an example, the window 132 includes one or more optical lenses and/or filters for focusing and/or filtering incoming light onto light sensing regions of the light sensor for, e.g., diagnostic or energy harvesting applications. In an example, the one or more transducers 94 include a light emitter (e.g., a light emitting diode, a laser, or a camera flash), and the window 132 includes one or more optical lenses and/or filters for focusing and/or filtering outgoing light generated by the light emitter and passing through the window 132 into the external environment. In an example, the one or more transducers 94 include a radio frequency (RF) energy harvesting coil transducer, and the window 132 includes one or more properties, characteristics, or features that match the impedance of incoming RF energy to the RF energy harvesting coil transducer. In an example, the one or more transducers 94 include a temperature sensor (e.g., a metal thin film resistance temperature sensor), and the window 132 includes properties, characteristics, or features that improve thermal energy transfer from the external environment to the temperature sensor.

FIG. 7C shows an example of the cover 128 that includes an opening that contains a flexible membrane 134 over one or more of the transducers 94. In an example, the one or more transducers 94 include an input audio device (e.g., a microphone) that includes the membrane 134 which operates as a diaphragm by moving back-and-forth in response to sound waves, and a coil attached to the diaphragm moves back-and-forth in relation to a magnetic field of a magnet to generate an electrical current in the coil that is indicative of sound levels in the vicinity of the membrane 134. In an example, the one or more transducers 94 include an output audio device (e.g., a loudspeaker) that includes the membrane 134 which operates as a diaphragm by moving back-and-forth to produce sounds (e.g., a loud notification alert) in response to an input electrical signal (e.g., a signal generated in response to the detection of an event, such as a loud sound, the presence of smoke, a rapid acceleration or deceleration, etc.).

FIG. 7D shows an example of the cover 128 that includes an opening 136 over one or more of the transducers 94. In an example, the one or more transducers 94 include an audio device (e.g., a loudspeaker or microphone). In an example, the audio device includes a speaker that emits a sound in response to detection of an event (e.g., an acceleration above a threshold acceleration level, a sound above a threshold sound level, a torsion above a threshold torsion level, and/or a strain above a threshold level of strain). In an example, the one or more transducers 94 include a chemical sensor or biosensor (e.g., a surface acoustic wave device) that includes a surface that is coated with an exposed layer of suitable material such as polymers, metals, and metal oxides that target specific analytes (e.g., chemicals or biological entities) that change the propagation or other functional characteristics of the sensor in response to exposure to the target analytes. In an example, the chemical sensor or biosensor may include one or more optical emitters (e.g., a light emitting diode) for illuminating one or more of the target chemicals or biomarkers. In an example, the chemical sensor or biosensor may include one or more optical sensors (e.g., an image sensor or camera) for detecting target color changes in the chemicals or biomarkers.

Because battery power is finite and the power needs of any particular tracking adhesive product segment generally is unknown, some examples of the tracking adhesive product segments are preconfigured in a power-off state and to remain in the power-off state until a predetermined event occurs. In some cases, the predetermined event indicates that the adhesive product segment has been deployed for use in the field. Example events include cutting a segment of a tracking adhesive product from a roll, bending a segment of a tracking adhesive product as it is being peeled off of a roll, separating a segment of a tracking adhesive product from a sheet, and detecting a change in state of the tracking adhesive product.

Figure 8A:
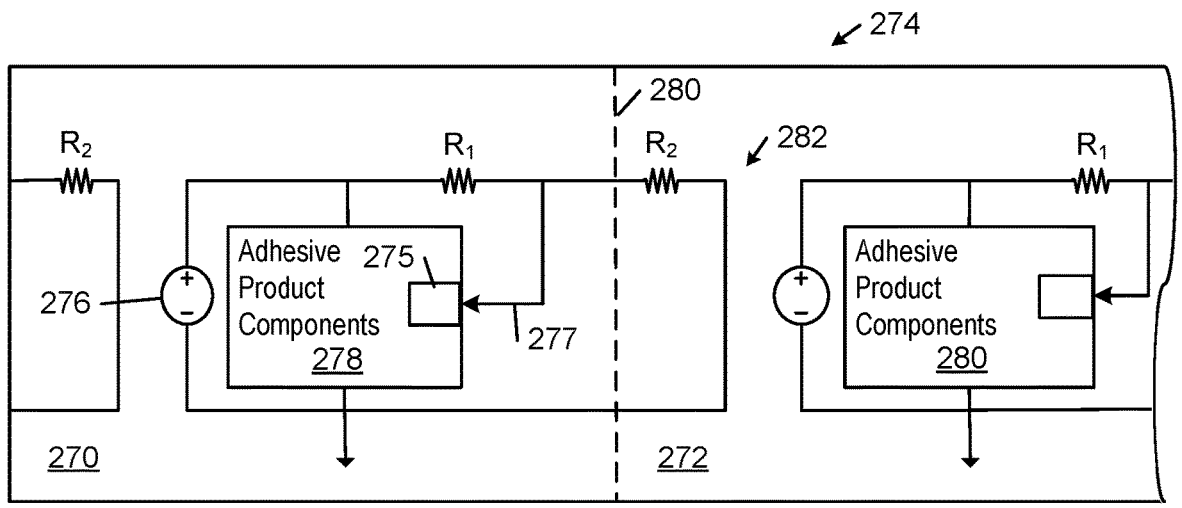
FIG. 8A is a diagrammatic top view of a length of an example tracking adhesive product.

Referring to FIG. 8A, in some examples, each of one or more of the segments 270, 272 of a tracking adhesive product 274 includes a respective circuit 275 that delivers power from the respective energy source 276 to the respective tracking circuit 278 (e.g., a processor and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the tracking adhesive product 274, for example, by cutting across the tracking adhesive product 274 at a designated location (e.g., along a designated cut-line 280). In particular, in its initial, un-cut state, a minimal amount of current flows through the resistors $R_1$ and $R_2$. As a result, the voltage on the wake node 270 remains below the threshold turn-on level. After the user cuts across the tracking adhesive product 274 along the designated cut-line 280, the user creates an open circuit in the loop 282, which pulls the voltage of the wake node above the threshold level and turns on the wake circuit 275. As a result, the voltage across the energy source 276 will appear across the tracking circuit 278 and, thereby, turn on the segment 270. In particular embodiments, the resistance vale of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more of the respective tracking components 278 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 8B:
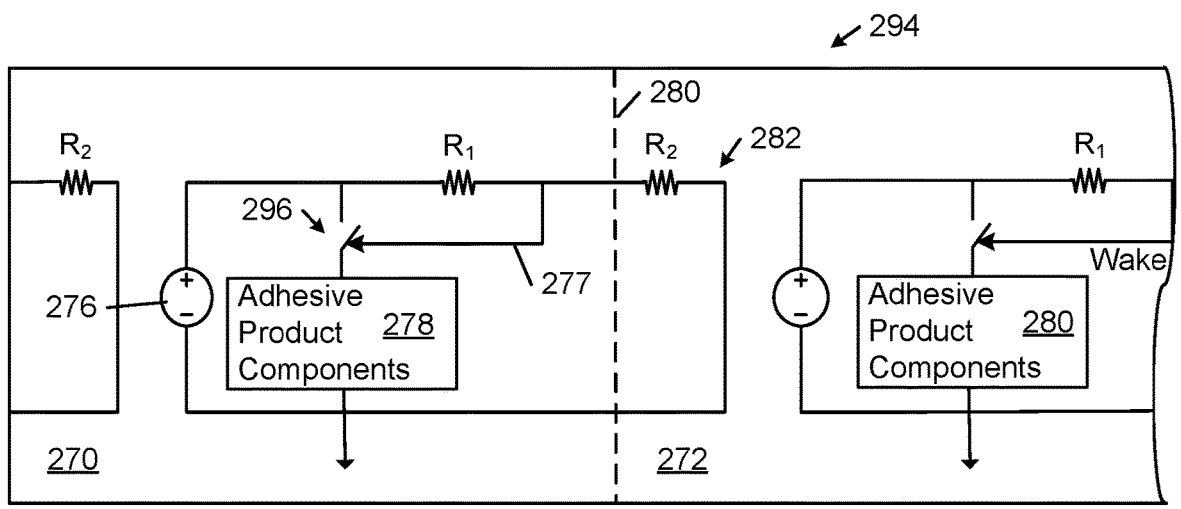
FIG. 8B is a diagrammatic top view of a length of an example tracking adhesive product.

FIG. 8B shows another example of a tracking adhesive product 294 that delivers power from the respective energy source 276 to the respective tracking circuit 278 (e.g., a processor and one or more wireless communications circuits) in response to an event. This example is similar in structure and operation as the tracking adhesive product 294 shown in FIG. 8A, except that the wake circuit 275 is replaced by a switch 296 that is configured to transition from an open state to a closed state when the voltage on the switch node 277 exceeds a threshold level. In the initial state of the tracking adhesive product 294, the voltage on the switch node is below the threshold level as a result of the low current level flowing through the resistors $R_1$ and $R_2$. After the user cuts across the tracking adhesive product 294 along the designated cut-line 280, the user creates an open circuit in the loop 282, which pulls up the voltage on the switch node above the threshold level to close the switch 296 and turn on the tracking circuit 278.

Figure 8C:
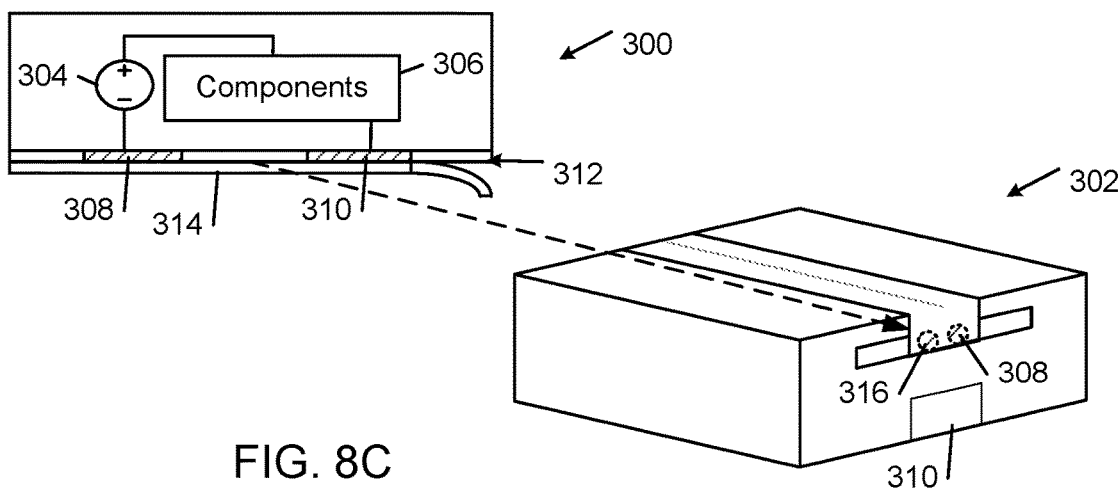
FIG. 8C is diagrammatic cross-sectional side view of an example tracking adhesive product and an example package.

FIG. 8C shows a diagrammatic cross-sectional front view of an example tracking adhesive product 300 and a perspective view of an example package 302. Instead of activating the tracking adhesive product in response to separating a segment of the tracking adhesive product from a roll or a sheet of the tracking adhesive product, this example is configured to supply power from the energy source 302 to turn on the tracking circuit 306 in response to establishing an electrical connection between two power terminals 308, 310 that are integrated into the tracking adhesive product. In particular, each segment of the tracking adhesive product 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the tracking adhesive product 300. In operation, the tracking adhesive product can be activated by removing the backing sheet 314 and applying the exposed adhesive layer 312 to a surface that includes an electrically conductive region 316. In the illustrated embodiment, the electrically conductive region 316 is disposed on a portion of the package 302. When the adhesive backside of the tracking adhesive product 300 is adhered to the package with the exposed terminals 308, 310 aligned and in contact with the electrically conductive region 316 on the package 302, an electrical connection is created through the electrically conductive region 316 between the exposed terminals 308, 310 that completes the circuit and turns on the tracking circuit 306. In particular embodiments, the power terminals 308, 310 are electrically connected to any respective nodes of the tracking circuit 306 that would result in the activation of the tracking circuit 306 in response to the creation of an electrical connection between the power terminals 308, 310.

In some examples, after an adhesive product segment is turned on, it will communicate with the tracking service 54 to confirm that the user/operator who is associated with the adhesive product segment is an authorized user who has authenticated himself or herself to the tracking service 54. In these examples, if the adhesive product segment cannot confirm that the user/operator is an authorized user, the adhesive product segment will turn itself off.

FIG. 9 shows an example method of detecting occurrence of an event near an adhesive wireless communications and transducer platform segment 102. Respective signals indicative of conditions near the adhesive wireless communications and transducer platform segment 102 are received from one or more transducers (FIG. 9, block 150). In some examples, one or more transducers integrated into or mechanically coupled to adhesive wireless communications and transducer platform segment 102 can receive input stimulus and produce therefrom output signals indicative of conditions detected by one or more of the transducers. Data specifying the conditions near the adhesive wireless communications and transducer platform is transmitted to a processor that detects an occurrence of an event (FIG. 9, block 152). In some examples, the processor (e.g., a computer of the network service 54, the client computer 58, or the adhesive wireless communications and transducer platform segment 102) can detect the occurrence of the event by processing the data specifying the detected conditions using one or more of a machine learning classification algorithm, a deterministic algorithm that applies one or more criteria defining the event, or a heuristic.

After a particular event has been detected, one or more of the network service 54, the client computer 58, and the adhesive wireless communications and transducer platform segment 102 can respond in a variety of different ways depending on the detected event type and, in some cases, the context of the detected event. For example, one or more of the network service 54, the client computer 58, and the adhesive wireless communications and transducer platform segment 102 may generate a respective notification.

For example, in an example scenario, the detected event relates to a crime or potential harm to a person (e.g., a rapid acceleration or deceleration indicating a car accident or a fall, smoke or other harmful chemicals, a rapid rise in the detected ambient temperature), the adhesive wireless communications and transducer platform segment 102 can emit an audible alarm to alert nearby persons and automatically place a call to emergency services. The adhesive wireless communications and transducer platform segment 102 also can transmit a notification of the event to the network service 54, which can take appropriate action depending on the nature of the event (e.g., the network service 54 can call emergency services).

In another example scenario, the network service 54 may track an adhesive wireless communications and transducer platform segment (e.g., adhesive bandage 49) that is known to be associated with a child, and issue an alert to the network service 54 or emergency services when the child is determined to be outside a permitted geographic area or is determined to be near or in an unsafe location (e.g., a pool, highway, or construction site) in a context that is detected as an event by a trained machine learning model, a deterministic algorithm that applies one or more criteria defining the event, or a heuristic.

Referring to FIG. 10, in another example scenario, the network service 54 tracks an adhesive wireless communications and transducer platform segment 102 that is associated with construction equipment—including power tools such as drills 156 and jackhammers, forklifts, bulldozers, and other vehicles—and issues a potential theft alert to a designated security service or emergency services when the construction equipment is determined to be outside a permitted geographic area (e.g., the designated construction site) and/or the adhesive wireless communications and transducer platform segment 102 stops transmitting a regular heartbeat signal in a context that is detected as an event by a trained machine learning model, a deterministic algorithm that applies one or more criteria defining the event, or a heuristic.

FIG. 11A shows an example adhesive wireless communications and transducer platform segment 160 that includes a light reflective surface 162. In the illustrated example, the adhesive wireless communications and transducer platform segment 160 has a rectangular shape that is sized to fit on a fire extinguisher 164 (see FIG. 11B). In the illustrated example, the adhesive wireless communications and transducer platform segment 160 includes a removable backing layer that must be peeled off before adhering the segment 160 to the fire extinguisher 164.

Referring to FIG. 11B, in the illustrated example, the fire extinguisher 164 includes two adhesive reflectors 160 and 166. In an example, both adhesive reflectors 160, 166 are adhesive wireless communications and transducer platform segments, which may have the same or different sets of components. In this way, the adhesive reflectors 160, 166 can provide redundant or complementary sets of wireless communication and transducer components. In another example, only the top adhesive reflector 166 is implemented by an adhesive wireless communications and transducer platform segment; a conventional adhesive label implements the bottom adhesive reflector 160.

The network service 54 is configured to detect events relating to the first extinguisher 164 by monitoring one or both of the adhesive wireless communications and transducer platform segments 160, 166. In an example scenario, the network service issues an alert to a designated maintenance service, security service, or emergency services when the first extinguisher 164 is determined to be outside a permitted geographic area (e.g., the designated road or construction site), the adhesive wireless communications and transducer platform segment 160 stops transmitting a regular heartbeat signal, or a loud sound was reported by one or both of the adhesive wireless communications and transducer platform segments 160, 166 in a context that is detected as an event by a trained machine learning model, a deterministic algorithm that applies one or more criteria defining the event, or a heuristic.

Figure 12:
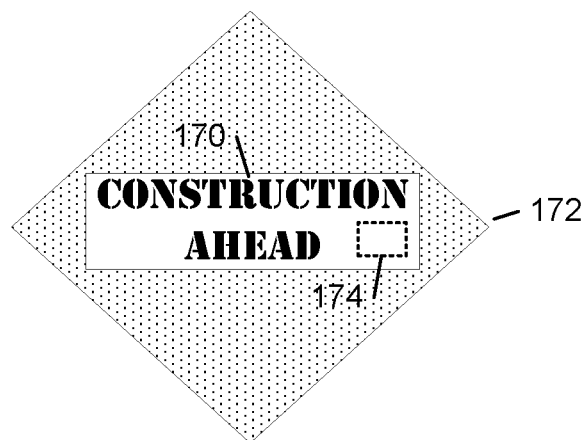
FIG. 12 is a diagrammatic view of an example adhesive wireless communications and transducer platform in the form of a label containing reflective lettering adhered to a traffic sign.

FIG. 12 shows an example adhesive wireless communications and transducer platform 102 in the form of a label 170 containing reflective lettering adhered to a traffic sign 172. In an example scenario, the adhesive wireless communications and transducer platform segment 170 includes an image sensor (e.g., a camera) behind a transparent window 174 in the cover of the adhesive wireless communications and transducer platform 170. In this example, the adhesive wireless communications and transducer platform 170 is configured to detect red light, speed, and other traffic violations in a context that is detected as an event by a trained machine learning model, a deterministic algorithm that applies one or more criteria defining the event, or a heuristic.

Figure 13:
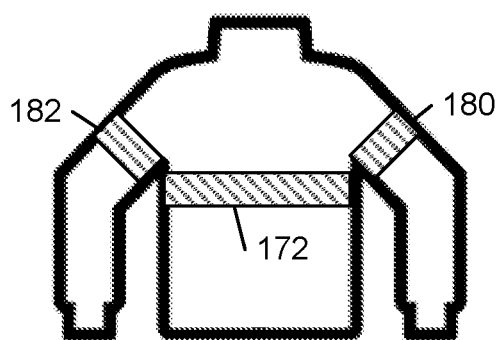
FIG. 13 is a diagrammatic view of an example of an adhesive wireless communications and transducer platform adhered to an example of clothing.

FIG. 13 shows an example of three adhesive wireless communications and transducer platforms 180, 182, 184 adhered to an example of clothing (e.g., a sweat shirt).

Figure 14:
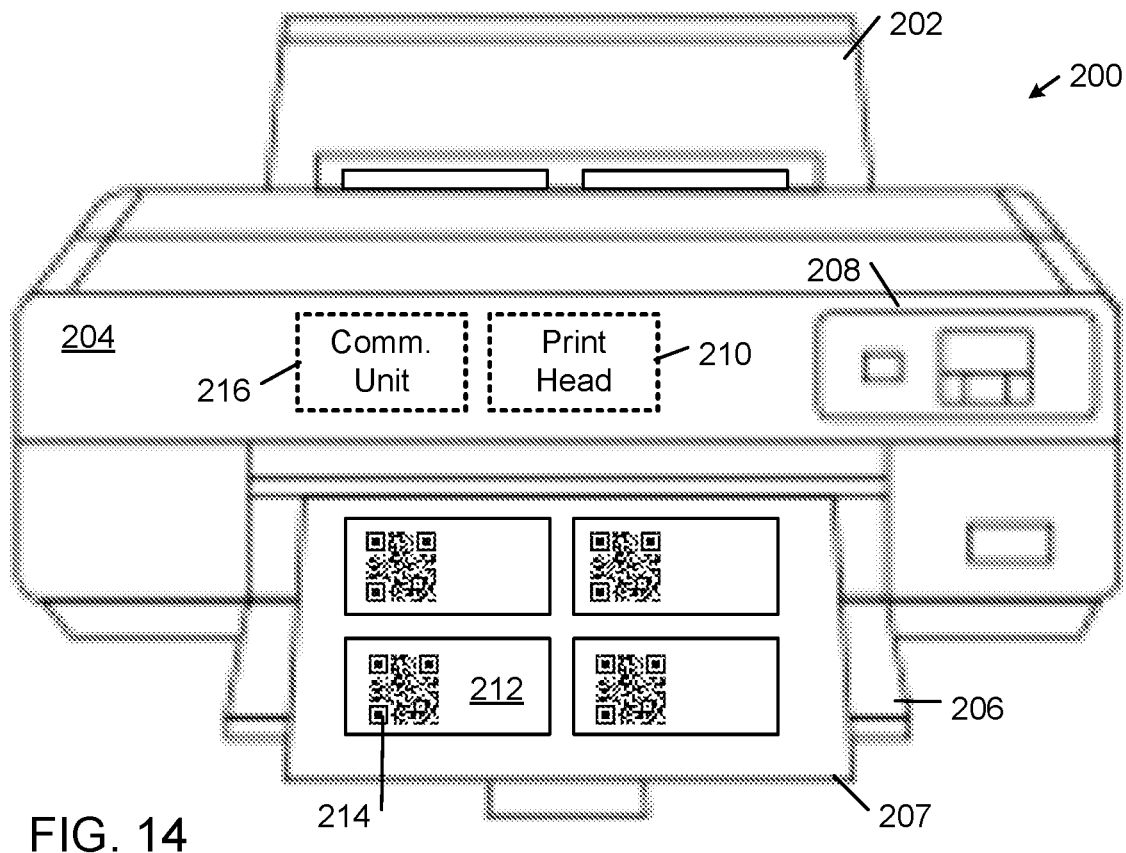
FIG. 14 is a diagrammatic view of a printing system.

FIG. 14 shows an example of a printing apparatus 200 (e.g., an inkjet printer, a laser printer, etc.). In the illustrated example, the printing apparatus 200 includes an output tray 206 and a control panel 208 with a display and operation controls at the font of the main printer body 204, and an input tray 202 or cassette that is attached to the back of the main printer body 204. The input tray 202 is coupled a feed mechanism (not shown) that feeds sheets of adhesive product 207 from a stack of adhesive product sheets in the tray into the main printer body 204 for printing, and the output tray 206 is configured to receive the printed sheets of the adhesive product 207. In other examples, the printing apparatus 200 includes an input mechanism for feeding a continuous sheet of the adhesive product from a roll into the main printer body 204 for printing, and an output mechanism for receiving the printed adhesive product on an output roll. In some examples, each adhesive product sheet and roll includes multiple segments of adhesive product.

The main printer body 204 includes a print head 210 that is configured to applying a marking substance (e.g., ink or toner) to the top surface of the adhesive product while the print head 210 reciprocates on a carriage (not shown) in a direction substantially orthogonal with respect to the direction in which the adhesive product is fed past the print head 210 in the main printer body 204. In the illustrative example shown in FIG. 14, the adhesive product 207 includes a sheet of adhesive product segments, each of which is marked with a different respective bar code (e.g., a two-dimensional barcode).

Figure 15A:
FIG. 15A is a diagrammatic view of a top surface of an example adhesive product segment.
Figure 15B:
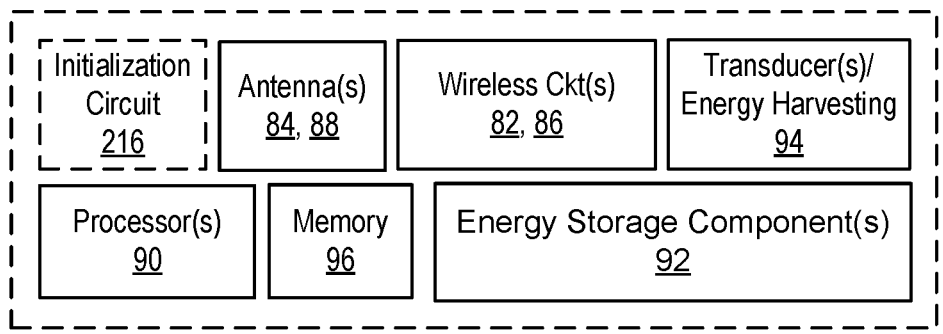
FIG. 15B is a diagrammatic view of components of the example adhesive product segment shown in FIG. 15A.

FIG. 15A shows an enlarged top view of a top surface of an adhesive product segment 212 that has been marked with a respective bar code, and FIG. 15B shows a block diagram of an example set of components included within the body of the adhesive product segment 212. In general, an adhesive product segment 212 may include any combination of the wireless communications and transducer components disclosed in connection with the segment examples shown in FIGS. 4 and 7A-7D.

In some examples, the adhesive product segment 212 also includes an initialization circuit 216 for initializing the adhesive product segment 212. In some of these examples, the initialization circuit 216 initializes the adhesive product segment in response to stimulus received from the printer 200.

In some examples, one or more components of the printing system 200 generate a stimulus that turns on the adhesive product segment 212 by connecting the energy storage component(s) 92 to one or more of the wireless circuit(s) 82, 86, transducer(s) 94, processor(s) 90, and the memory 96. In some of these examples, the energy storage component(s) 90 may be connected to one or more of the other components of the adhesive product segment 212 as the adhesive product segment 212 is being loaded into the printing system 200, as the print head 210 is printing markings on the top surface of the adhesive product segment 212, and/or after the adhesive product segment 212 has been printed out.

In some examples, the stimulus includes a change in capacitance or output of a bend sensor as the adhesive product segment 212 passes over or between one or more printer rollers that is detected by a transducer 94, which turns on a switch in the adhesive product segment 212 that connects the energy storage component(s) 92 to one or more of the other components of the adhesive product segment 212.

In some examples, the stimulus includes an electromagnetic wave wakeup signal that is generated by a transmitter or transceiver (e.g., a near field communication transceiver) component of the printer 200 (e.g., a communications unit 216) and is detected by a wakeup circuit in the adhesive product segment 212, which connects the energy storage component(s) 92 to one or more of the other components of the adhesive product segment 212. In some examples, the electromagnetic wave stimulus induces in a receiver component (e.g., a coil antenna) of the adhesive product segment 212 a current that enables data to be read from the memory component 96. In some examples, the electromagnetic wave transmitter or transceiver is located on the print head 210. In some examples, some or all of the data that is printed on the top surface of the adhesive product segment 212 also can be stored in the memory 96 of the adhesive product segment 212.

After one or more electronic components of an adhesive product segment 212 have been activated, the communications unit 216 can communicate with the adhesive product segment 212. For example, the communications unit 216 may read and/or write data to the memory 96. In some examples, the communications unit 216 reads data, such as an identification number (e.g., a universally unique identifier (UUID)) that is stored in the memory 96, and/or stores data, such as an identification number (e.g., a universally unique identifier (UUID)) in the memory 96. In some examples, one or more other devices (e.g., a mobile phone) may have read or write access to data to the memory 96 of an adhesive product segment.

In some examples, one or more components of the printing system 200 generate a stimulus that turns off the adhesive product segment 212 by disconnecting the energy storage component(s) 92 from one or more of the wireless circuit(s) 82, 86, transducer(s) 94, processor(s) 90, and the memory 96. In some examples, the adhesive product includes one or more switches or relays (e.g., general-purpose input/output (GPIO) channel) that enables the adhesive product to be shutdown according to a processor controlled hibernation protocol.

In some examples, before or during printing, the communications unit 216 retrieves data stored in the memory 96 of one or more of the adhesive product segments 212 or other memory component of the adhesive product 207, and sends the retrieved data to be integrated into the print content to the printer controller for printing on the top surfaces of one or more of the adhesive product segments by the print head 210. In some examples, a user's mobile device may write data to a memory component of the adhesive product 207 that directs the printer what to print based on information (e.g., a calendar date or time) that is uploaded from the memory component by the communications unit 216.

In some multi-segment adhesive product sheet examples, the adhesive product sheet has a shared controller across multiple labels that create a hierarchy of computing that is used to configure the printing system 200. In some of these examples, one of the segments of the adhesive product sheet is the master and other segments are the slaves with respect to communications between the adhesive product sheet 207 and the printing system 200.

Figure 16:
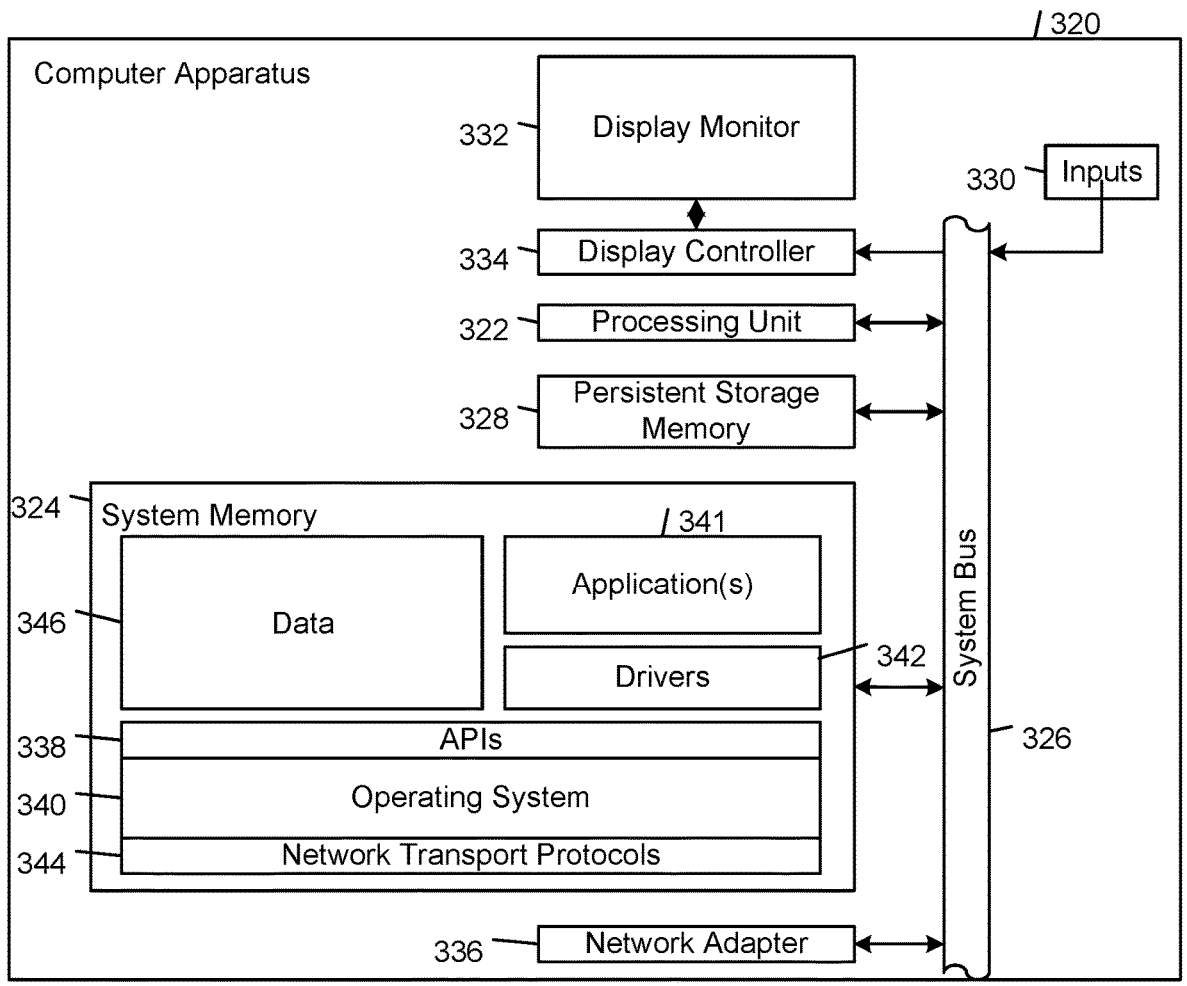
FIG. 16 is a block diagram of an example computer apparatus.

FIG. 16 shows an example embodiment of computer apparatus 320 that, either alone or in combination with one or more other computing apparatus, is operable to implement one or more of the computer systems described in this specification, including one or more of the tracking service system 54, the network system 52, the client system 58, and the monitoring equipment 56.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A wireless sensor device comprising:
   a flexible substrate;
   a flexible cover layer on the substrate; and
   a device layer between the flexible substrate and the flexible cover layer, the device layer comprising:
      a sensor operable to generate ambient data characterizing an environmental state of the wireless sensor device in response to exposure to externa stimulus, wherein
      a respective opening in the flexible substrate or in the flexible cover layer is aligned with the respective sensor.

2. The wireless sensor device of claim 1, wherein the sensor comprises one or more of a light sensor, an image sensor, a radio frequency energy harvesting coil electrically coupled to an energy storage component, a biosensor, a chemical sensor, a temperature sensor, a vibration sensor, and a microphone.

3. The wireless sensor device of claim 1, wherein the opening in the laminated structure comprises a window that is optically transparent to light within a wavelength range that corresponds to a wavelength range of the sensor.

4. The wireless sensor device of claim 1, wherein the sensor is a microphone and the opening in the laminated structure comprises a diaphragm of the microphone.

5. The wireless sensor device of claim 1, the device layer further comprising:
   an antenna;
   a wireless communications system coupled to the antenna;
   a processor coupled to the wireless communications system and the sensor;
   an energy storage component; and a
   memory or computer-readable storage medium.

6. The wireless sensor device of claim 5, wherein the memory or computer-readable storage medium comprises instructions which, when executed by the processor, causes the processor to perform operations comprising:
   evaluating the ambient data;
   ascertaining whether the evaluated ambient data is detected as an event, and
   responding to a detected event.

7. The wireless sensor device of claim 6, wherein evaluated ambient data is detected as an event based on determining that a parameter in the evaluated ambient data being above a threshold level.

8. The wireless sensor device of claim 7, wherein the parameter is one or more of an acceleration level, a temperature level, a torsion level, and a strain level.

9. The wireless sensor device of claim 1, the device layer further comprising an output transducer configured to receive an input signal and produce an output stimulus based on the received input signal.

10. The wireless sensor device of claim 9, wherein the input signal comprises an analog signal.

11. The wireless sensor device of claim 9, wherein the output transducers comprise one or more of a light emitting diode (LED), a display, an acoustic emitter, an electric motor, a thermal radiator, a laser, and an odor emitter.

12. The wireless sensor device of claim 9, wherein an opening in the flexible substrate or in the flexible cover layer is aligned with the respective output transducer.

13. A wireless communication device comprising:
   a laminated structure comprising a cover and a substrate; and
   a device layer between the cover and the substrate, the device layer comprising:
      a first sensor comprising one or more of a temperature sensor, a humidity sensor, and a pressure sensor, and
      a wireless communication system coupled to an antenna, wherein
   a respective opening in the laminated structure is aligned with the first sensor.

14. The wireless communication device of claim 13, the device layer further comprising a second sensor.

15. The wireless communication device of claim 14, the second sensor comprising one or more of a vibration sensor, a light sensor, an image sensor, and an acoustic sensor.

16. The wireless communication device of claim 14, wherein an opening in the laminated structure is aligned with the second sensor.

17. A wireless communication device comprising:
   a flexible substrate;
   a flexible cover layer on the substrate; and
   a device layer between the flexible substrate and the flexible cover layer, the device layer comprising:
      an emitting transducer operable to convert input power into output power;
      a respective opening in the flexible substrate or in the flexible cover layer is aligned with the respective sensor.

18. The wireless communication device of claim 17, wherein the emitting transducer comprises one or more of an optical emitter, a display, an acoustic emitter, a loudspeaker, an electromagnetic wave emitter, an odor emitter, an electric motor, and a thermal radiator.

19. The wireless communication device of claim 17, wherein the emitting transducer is a speaker and the opening in the laminated structure comprises a diaphragm of the speaker.

* * * * *